United States Patent [19]
Wyrwas

[11] Patent Number: 6,128,468
[45] Date of Patent: Oct. 3, 2000

[54] SATELLITE COMMUNICATIONS TERMINAL LOCATION SYSTEM AND METHOD

[75] Inventor: Richard Wyrwas, London, United Kingdom

[73] Assignee: ICO Services Ltd., London, United Kingdom

[21] Appl. No.: 09/045,114

[22] Filed: Mar. 20, 1998

[30] Foreign Application Priority Data

Mar. 25, 1997 [GB] United Kingdom ............... 9706345

[51] Int. Cl.[7] ............................................. H04B 7/185
[52] U.S. Cl. ....................... 455/12.1; 455/427; 455/456; 342/357
[58] Field of Search ................... 455/12.1, 13.1, 455/456, 13.2, 427; 342/357.01–357.05, 357.16, 450

[56] References Cited

U.S. PATENT DOCUMENTS

| | | | |
|---|---|---|---|
| 4,386,355 | 5/1983 | Drew et al. | 342/357 |
| 4,744,083 | 5/1988 | O'Neill et al. | 371/22 |
| 5,412,389 | 5/1995 | Olds | 342/357 |
| 5,463,400 | 10/1995 | Tayloe | 455/12.1 |
| 5,543,813 | 8/1996 | Araki et al. | 342/357 |
| 5,552,795 | 9/1996 | Tayloe et al. | 342/357 |
| 5,955,986 | 9/1999 | Sullivan | 342/357.02 |

FOREIGN PATENT DOCUMENTS

| | | | |
|---|---|---|---|
| 0 210 396 A2 | 2/1987 | European Pat. Off. | |
| 0 562 374 A1 | 9/1993 | European Pat. Off. | H04B 7/195 |
| 2239758A | 7/1991 | United Kingdom | H04B 7/185 |
| WO 96/21162 | 7/1996 | WIPO | H04B 1/00 |
| WO 96/21332 | 7/1996 | WIPO | H04Q 7/38 |

*Primary Examiner*—Nguyen Vo
*Assistant Examiner*—Duc Nguyen
*Attorney, Agent, or Firm*—McDermott, Will & Emery

[57] ABSTRACT

In a satellite communications system, where a satellite 10 provides a plurality of radio beams 30, and where distance and/or angle measurement from a satellite 10 or satellites 10 enables the position of the user terminal 44, on the surface of the earth 14, to be measured to within an uncertainty of being in one out of a possible plurality of positions 142, when some out of the plurality of positions fall within a single beam 30A, which one of the plurality of possible positions 142 is actually occupied by the user terminal 44 is determined by assessing the quality of signals received from those other, adjacent, overlapping beams 30B–30G which surround the beam 30A.

17 Claims, 19 Drawing Sheets

6,128,468

SATELLITE COMMUNICATIONS TERMINAL LOCATION SYSTEM AND METHOD

FIELD OF THE INVENTION

The present invention relates to satellite communication systems, and a method of operating such systems. The invention particularly relates to satellite communication systems and related methods where an earth based user terminal communicates with a satellite which in turn communicates with an earth station, and vice versa. Most particularly, the present invention relates to such a system and its related methods where there is a requirement for the location of the user terminal, on the surface of the earth, to be known to the earth station.

BACKGROUND OF THE INVENTION

It is known, in a satellite communications system, for a user terminal, perhaps in the form of a radio telephone handset, not dissimilar to a cellular radio telephone handset, to communicate with an earth station, via a satellite, to establish a telephone call or to receive a telephone call, by means of the earth station linking into the terrestrial wire and cable system or into another radio telephone system.

There are twin purposes relating to establishing the exact position of the user terminal on the surface of the earth. Firstly, in order to know how to direct a radio signal to or from a user terminal, when required, from a particular satellite at a particular time, it is necessary to know the approximate location of the user terminal so that the appropriate beam from the appropriate satellite can be selected to cover the portion of the Earth's surface where the user terminal is located. Secondly, in a satellite communication system, in order that call barring, local billing or other restrictions based on the territory wherein the user terminal may be operated can be observed, it is necessary to determine the location of the user terminal with sufficient accuracy for the necessary restrictions to be imposed.

It is known to provide a user terminal where the individual user terminal employs "Global Positioning by Satellite" (GPS) to determine, with some great accuracy, the position of the user terminal on the surface of the earth. The user terminal then transmits, to the earth station, via the satellite or satellites involved in communications, its exact position which is then used by the earth station, in subsequent interactions with the user terminal, to control the fiscal and mechanical aspects of the communication activity with the user terminal. An example of such a system is to be found in European Patent EP 0562 374 by Motorola Corporation filed Mar. 27, 1993. The GPS system tends to be very slow of access, requires a very sophisticated receiver of a costly nature, and the GPS satellites can often be totally inaccessible to the user terminal, in sufficient simultaneous numbers for a position determination to be achieved. In addition, the accuracy of the position determination is well in excess of what is actually required for satellite communications purposes.

Such systems require unnecessary complication of the handset, in order that the handset may be capable both of communications and of GPS measurements.

It is advantageous, therefore, to provide a system and method whereby the position, on the surface of the earth, of the user terminal or handset can be determined with sufficient accuracy for communication and fiscal purposes without undue complication of the handset or user terminal.

In another system, it is merely necessary for the satellite to receive a transmission from the user terminal, in response to the earth station, via the satellite, requesting radio communication from the user terminal, for the earth station to use the delay in response from the user terminal for ranging purposes and to use the doppler shift on the received frequency from the user terminal, together with a foreknowledge of the position and velocity of the satellite, to determine, with a certain degree of precision, the position of the user terminal on the surface of the earth.

Unfortunately, if the cost of the user terminal is to be kept at realistic limits, consistent with the trade in handheld mobile radio telephones, the accuracy of the crystal clock or other frequency source within the user terminal cannot be made consistent with sufficient accuracy of determination of the position of the user terminal, on the surface of the earth, for the functional and fiscal aspects connected with operation of a satellite telephone communication system.

Even when these problems are overcome, there is always an uncertainty as to which of a possible plurality of positions the user terminal or handset actually occupies. If the possible positions are widely separated, so as to fall into separate radio beams from the satellite, it is always possible to resolve the ambiguity by detecting in which beam the user terminal lies. When, however, the beams are very large, or the possible points very close together, so that two or more possible points fall within a single beam, resolution of the uncertainty becomes a problem. The present invention seeks to provide a system and method to address this problem.

SUMMARY OF THE INVENTION

According to a first aspect, the present invention consists in a radio system operative to measure the position of a radio terminal to within an uncertainty of being at any one out of a plurality of possible positions, said system being operative to provide a plurality of abutting radio beams, said system, in the event that some of said plurality of possible positions lie within one out of said plurality of abutting radio beams, being operative to assess the quality of radio signals, receivable at said terminal from adjacent others out of said plurality of abutting radio beams and to select, as the actual position of said terminal, that one out of said plurality of possible positions which is closest to those out of said adjacent others out of said plurality of radio beams which provide the best quality of radio signal.

According to a second aspect, the present invention consists in a method, employing radio to measure the position of a radio terminal to within an uncertainty of being at any one out of a plurality of possible positions, said method including the steps of: providing a plurality of abutting radio beams; detecting if some of said plurality of possible positions lie within one out of said plurality of abutting radio beams; assessing the quality of radio signals, receivable at said terminal from adjacent others out of said plurality of abutting radio beams; and selecting, as the actual position of said terminal, that one out of said plurality of possible positions which is closest to those out of said adjacent others out of said plurality of radio beams which provide the best quality of radio signal.

The invention further provides a system and method wherein each of the radio beams each carry radio signals comprising digital data, the system and method assessing the quality of said radio signals by measuring the bit error rate of the digital data.

The invention further provides a system and method including assessment of the quality of said radio signals by measuring the amplitude of each of the radio signals.

The invention, yet further, provides a system and method for a satellite communications comprising said terminal, a communications satellite and an earth station, and wherein said plurality of radio beams are sent, by said satellite, towards said terminal.

The invention, still further, provides a system and method, where assessment of said quality of radio signals is achieved by taking an average of plural assessments for radio signals from each receivable beam.

The invention further provides a system and method wherein each of said plurality of radio beams has a rapidly fluctuating edge response, wherein said plurality of radio beams move in an array pattern relative to the user terminal, and wherein said averaging of plural assessments for radio signals from each receivable beam compensates for highs and lows in said rapidly fluctuating edge response.

The invention further provides a system and method wherein said terminal is operative to make plural assessments of quality of radio signals from each of said plurality of radio beams from which radio signals are receivable, wherein said terminal is operative to store the result of said plural assessments, and wherein, in the event that some of said plurality of possible positions lie within one out of said plurality of abutting radio beams, said terminal is operative to employ said previously stored assessments to resolve which out of said plurality of possible positions is occupied by said terminal.

The invention, even further, provides a system and method wherein said terminal is operative to send information to said earth station, via said satellite, wherein said terminal is operative to relay, to said earth station, assessment of quality of radio signal on each instance of receipt of a radio signal by said terminal, and wherein said earth station is operative to determine which out of said plurality of possible positions is occupied by said terminal.

In addition, the invention also provides a system and method wherein said terminal is operative to send information to said earth station, via said satellite, and wherein said terminal is operative to determine and to relay to said earth station, which out of said plurality of possible positions said terminal occupies.

The invention also provides a system and method where one or more satellites are used to measure the position of said terminal to within said uncertainty of being in any one out of a plurality of possible positions and further provides that said terminal is on the surface of the earth.

BRIEF DESCRIPTION OF THE DRAWINGS

The invention is further explained, by way of example, by the following description, taken in conjunction with the appended drawings, in which.

DETAILED DESCRIPTION

To commence the description of the present invention, an example is given of just one way in which the position of the user terminal can be measured with an uncertainty of being in one out of a possible plurality of positions. Within the scope of the present invention, it will become clear, to those skilled in the art, that other systems for the initial measurement can be used, provided only that an uncertainty or ambiguity exists as to which exact one out of a possible plurality of positions is occupied by the user terminal.

Figure 1:
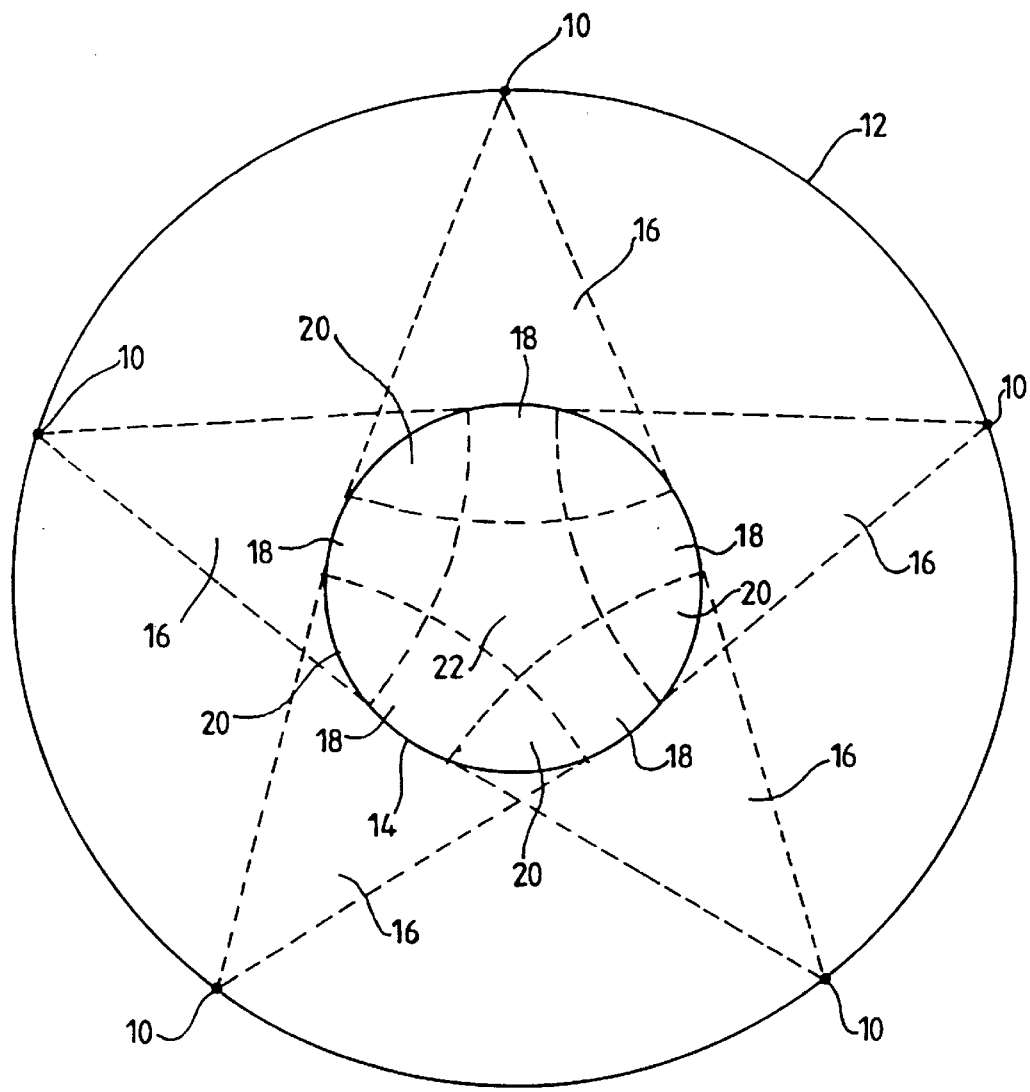
FIG. 1 shows a planar constellation of communications satellites disposed about the earth.

Attention is firstly drawn to FIG. 1 which shows a planar constellation of communications satellites disposed about the earth. The plurality of communications satellites 10 are evenly disposed around a circular orbit 12 above the surface of the earth 14. Each of the communications satellites 10 is designed to provide radio communications with apparatus on the surface to the earth 14 when the individual communications satellite 10 is more than 10 degrees above the horizon. Each communications satellite 10 therefore provides a cone 16 of radio coverage which intersects with the surface of the earth 14.

The surface of the earth has three types of areas. A first type of area 18 is one which has radio coverage from only one communications satellite 10. A second type of area 20 is an area where there is radio coverage from more than one communications satellite 10. Finally, a third type of area 22 receives radio coverage from none of the communications satellites 10 in the orbit 12 shown.

Figure 2:
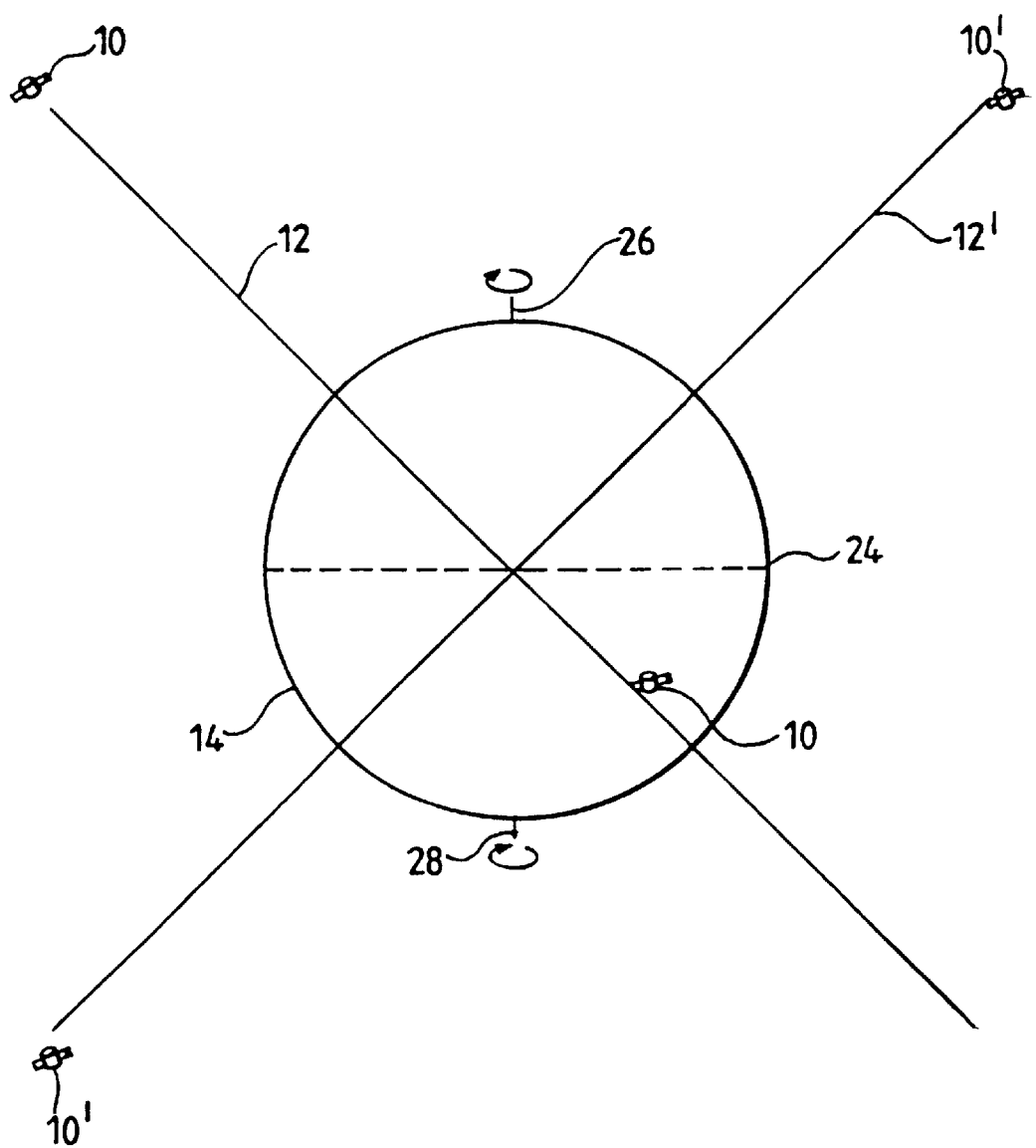
FIG. 2 illustrates how the communications satellites are disposed in orthogonal orbital planes.

FIG. 2 illustrates how the communications satellites 10 are disposed in orthogonal orbital planes. The first orbit 12 of FIG. 1 is supplemented by a second orbit 12' having communications satellites 10 disposed there about in a similar manner to that shown in FIG. 1. The orbits 12' are orthogonal to one another, each being inclined at 45 degrees to the equator 24 and having planes which are orthogonal (at 90 degrees) to each other.

In the example shown, the communications satellites 10 orbit above the surface of the earth 14 at an altitude of 10 500 km. Those skilled in the art will be aware that other orbital heights and numbers of communications satellites 10 may be used in each orbit 12, 12'. This configuration is preferred because the example provides global radio coverage of the earth 14, even to the north 26 and south 28 poles, with a minimum number of communications satellites 10. In particular, the orthogonality of the orbits ensures that the communications satellites 10 of the second orbit 12' provides radio coverage for the third types of area 22 of no radio coverage for the communications satellites in the first orbit 12, and the communications satellites 10 in the first orbit 12 provide radio coverage for those areas 22 of the third type where the communications satellites 10 of the second orbit 12' provide no radio coverage.

It will become clear that, although the two orbits 12, 12' are here shown to be of the same radius, the invention as hereinbefore and hereinafter described will function with orbits 12, 12' of different radii. Equally, there may be more than two orbits 12, 12'. So far as the present invention is concerned, the only requirement is that every part of the surface of the earth 14 is in receipt of radio coverage from at least one communications satellite 10 at all times.

Figure 3:
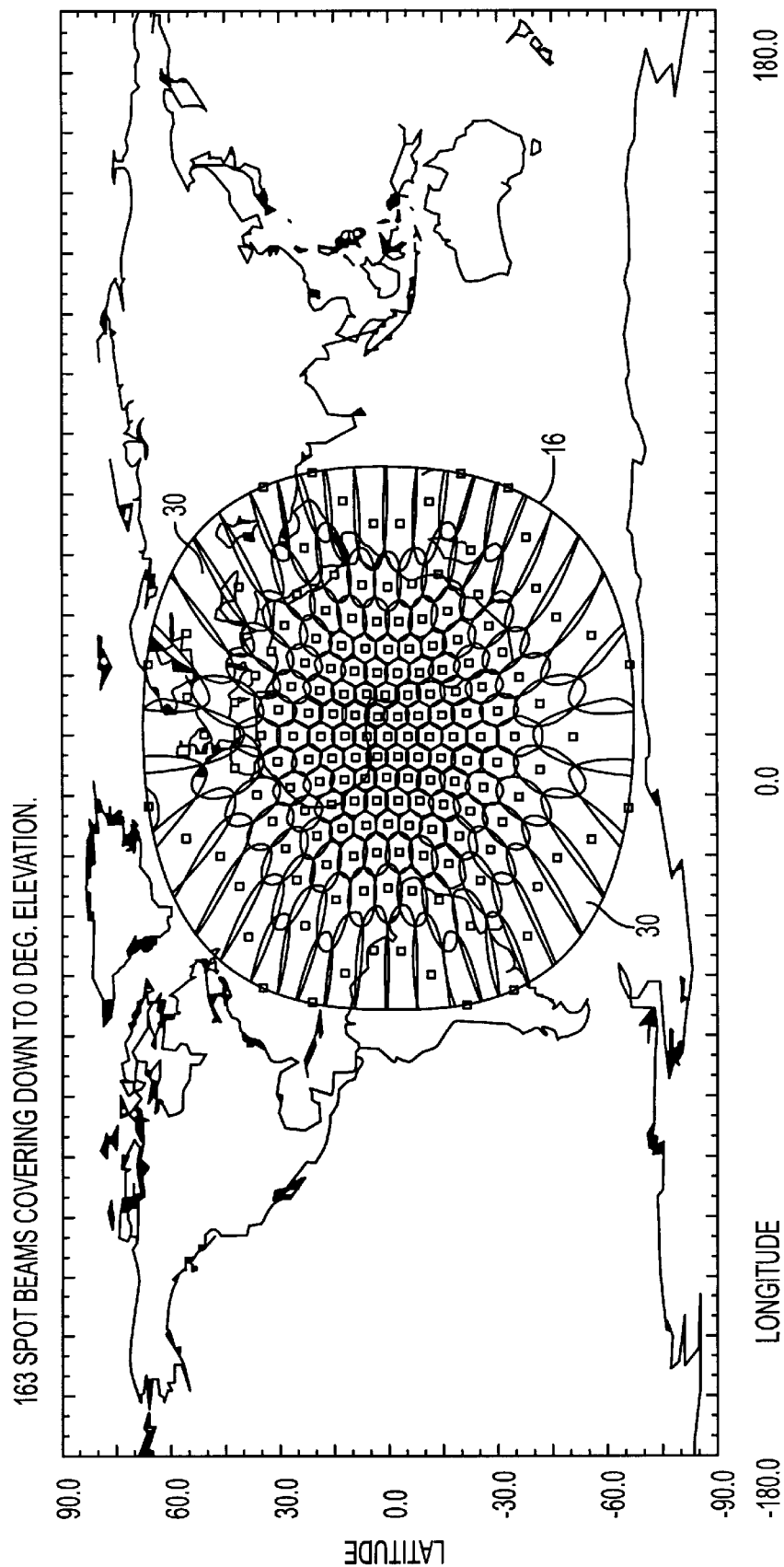
FIG. 3 shows the structure of the cone of radio coverage provided by each communications satellite.

FIG. 3 shows the structure of the cone 16 of radio coverage provided by each communications satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the communications satellite 10. The communications satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
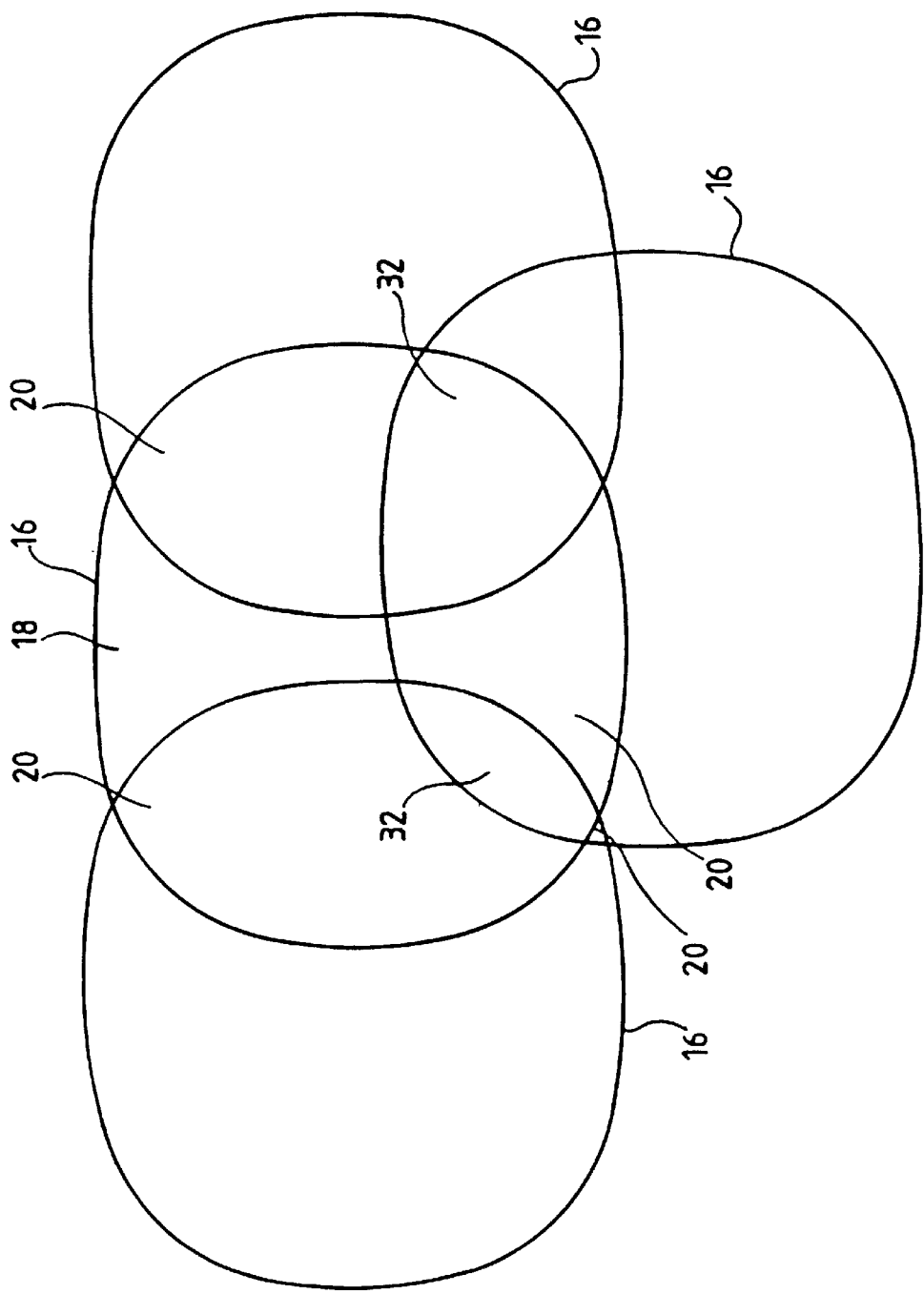
FIG. 4 shows how the cones of radio coverage, shown in FIG. 3 may interact with the surface of the earth to produce many types of different regions.

FIG. 4 shows how the cones 16 of radio coverage may interact with the surface of the earth to produce many types of different regions.

As discussed with reference to FIG. 1, numerous cones or radio coverage 16 may overlap to produce first areas 18 where there is radio coverage by only one communications satellite, second areas 20 where there is radio coverage by two communications satellites, and even fourth areas 32 where coverage is provided by three or more communications satellites. It is to be understood that each of the cones 16 of radio coverage represented in FIG. 4 is divided, as shown in FIG. 3, into its own independent set of spot beams 30.

Figure 5:
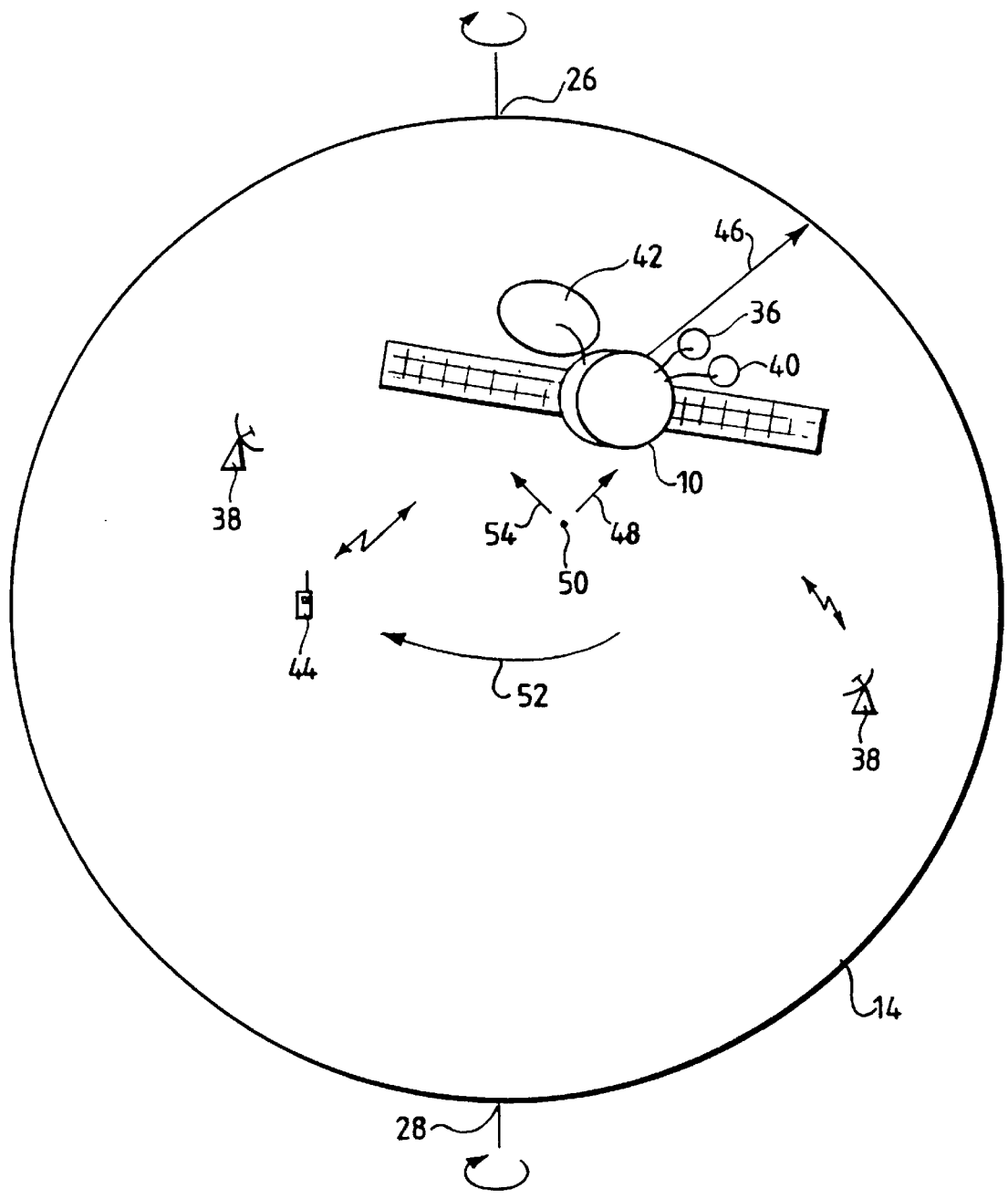
FIG. 5 is a view, from above, of a communications satellite above the surface of the earth, illustrative of the various motions relative to the earth.

FIG. 5 is a view, from above, of a communications satellite 10 above the surface of the earth.

The communications satellite 10 comprises solar panels 34 for power supply, a downlink antenna 36 for sending bulk telephone traffic to one of a plurality of earth stations 38, and uplink antenna 40 for receiving general traffic from the earth stations 38, and a subscriber antenna 42 which provides the plurality of spot beams 30, shown in FIG. 3, intended to provide communications with user terminals 44 which may be provided in a form not dissimilar to a hand held cellular radio telephone. It is to be understood that the user terminal 44 may also comprise more elaborate vehicle mounted equipment for use in land vehicles, ships and aircraft.

With the parameters mentioned in this preferred example, the communications satellite moves around its orbit 12 12', as indicated by a first arrow 46, with a velocity of 4.9 km per second. Ignoring for the moment the rotation of the earth 14, the spot beams 30 also move across the surface of the earth 14 with a similar velocity along a ground track as indicated by a second arrow 48. The point immediately beneath the communications satellite, is known as the nadir 50.

At the same time the earth 14 is rotating, at its equator with a velocity of 0.47 km per second, as indicated by a third arrow 52. Directions, relative to the ground track 48, at 90 degrees thereto, are termed crosstrack as indicated by a fourth arrow 54. Hereinafter, the position of the user terminal 44 is defined with reference to its distance along the ground track 48 and its distance along the cross track 54 with reference to the nadir 50.

Figure 6:
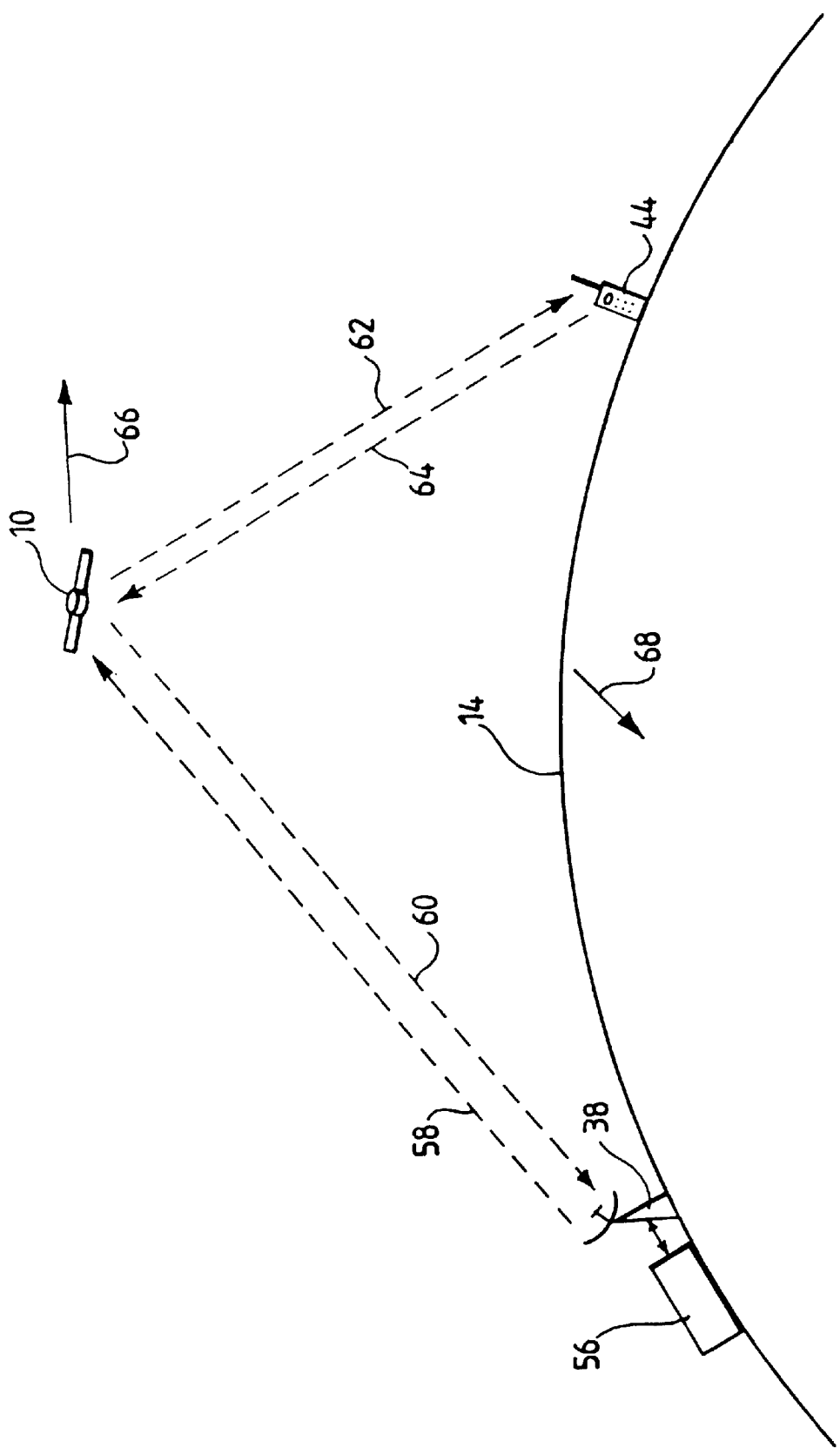
FIG. 6 is a schematic view of the general situation where an earth station talks to a user terminal via the communications satellite to determine propagation delays between the user terminal and the communications satellite.

FIG. 6 is a schematic view of the general situation where an earth station 38 talks to a user terminal 44 or via the communications satellite 10.

The earth station 38 further comprises an earth station controller 56 which controls the activity of the earth station 38. The earth station 38 is located at a first point on the surface of the earth 14 and the user terminal 44 may be at any other point on the surface of the earth within range of the communications satellite 10 when the communications satellite 10 is in range of the earth station 38.

The earth station 38 communicates with the communications satellite 10 via an uplink radio link 58, via the uplink antenna 40 of FIG. 5, using frequencies in the band 5150 to 5250 megahertz. The earth station 38 receives signals from the communications satellite 10 via the downlink antenna 36 of FIG. 5 on a downlink radio link 60 using signals in the frequency range 6975 to 7075 megahertz.

The user terminal 44 receives signals from the communications satellite 10 via a user terminal downlink 62 using frequencies in the range 2170 to 2200 megahertz. The user terminal 44 sends messages and signals to the communications satellite 10 via a user terminal uplink 64 operating in the frequency band 1980 to 2010 megahertz. These frequencies are merely exemplary and those skilled in the art will be aware from the following description, that the invention could be practised using numerous other frequencies for the uplinks and downlinks.

Implicit in FIG. 6, but not specifically shown, is the fact that communications satellite 10 contains its own precise oscillator, conveniently in the form of a crystal oscillator, which the communications satellite 10 uses for converting the frequencies of incoming and outgoing signals and for use as a frequency reference when synthesising frequencies. Likewise, the user terminal 44 contains its own internal synthesised oscillator, working from a master oscillator, preferable a crystal oscillator, for converting frequencies of incoming signals and synthesising the frequencies of outgoing signals.

Equally, the earth station 38 and the earth station controller 56 between them contain, or have access to, extremely precise frequency references and time references. These references may actually be contained within the earth station 38 and the earth station controller 56, or may be derived from elsewhere via a land line or other service.

The exact location, on the surface of the earth 14, of the earth station 38, is known with great precision. Likewise, the parameters or the orbit 12 12' of the communications satellite 10 and its position in that orbit, at any instant, are also known with great precision. The uncertain element, which is the purpose of the present invention to resolve, is the position of the user terminal 44 on the surface of the earth 14.

Not previously mentioned, is the fact that the user terminal 44 transmits on the user terminal uplink 64 to the subscriber antenna 42 and similarly receives on the user terminal downlink link 62 from the subscriber antenna 42. The communications satellite 10 will only be in communication with one earth station 38 at a time, but may be in communication with a great many user terminals 44. Each user terminal will be in one particular spot beam 30 of the plurality of spot beams shown in FIG. 3.

The communications satellite 10 will be moving relative to the surface of the earth 14, and therefore relative to the earth station 38 and to the user terminal 44, as indicated in a fifth arrow 66. Likewise, the surface of the earth 14 will be moving relative to the orbit 12 12' of the communications satellite 10 as generically indicated by a sixth arrow 68.

The signals exchanged between the earth station 38 and the communications satellite 10, in common with the signals exchange between the user terminal 44 and the communications satellite 10, all enjoy a propagation delay and a frequency shift, due to the motion of the communications satellite 10 relative to the earth station 38 and to the user terminal 44 caused by the doppler effect. The embodiment of the present invention in part concerns itself with means of employing the doppler shift in frequencies, due to the motion of the communications satellite 10, and measurement of the propagation delay, to determine the position of the user terminal 44 on the surface of the earth 14.

In the embodiment of the present invention, propagation delay is measured between the earth station 38 and the user terminal 44. The earth station 38 sends out a signal on the uplink radio link 58 to the communications satellite 10 which is, in turn, sent to the user terminal 44 via the user terminal downlink 62. Upon receipt of the signal from the earth station 38, the user terminal waits for a predetermined period and then sends its own message, via the user terminal uplink 64 and the downlink radio link 60, back to the earth station 38. The earth station controller 56 notes the elapse of time from the instant that the earth station 38 began to transmit the message on the uplink radio link 58 and the instant when the earth station 38 began to receive the response message from the user terminal 44 from the downlink radio link 60. The earth station controller 56 knows the propagation delay times for signals, through the communications satellite 10, from the uplink radio link 58 onto the user terminal downlink 62 and, correspondingly, the propagation delay through the communications satellite 10 between the user terminal uplink 64 and the downlink radio link 60. Equally, the earth station controller 56 knows, with precision, the predetermined elapsed time employed by the user terminal 44 before it responds to the received message from the earth station 38. These propagation delays and the predetermined delay of the user terminal 44 are subtracted, by the earth station controller 56, from the overall elapsed time to determine the actual propagation delay of the radio wave via the various links 58, 60, 62, 64 in the return journey of the message from and to the earth station 38. The radio wave propagates always at the speed of light, which is constant. Because the position of the earth station 38, on the surface of the earth, is precisely known, and because the position of the communications satellite 10 in its orbit 12 12' is also precisely known, the sum of the propagation delays on the uplink radio link 58 and the downlink radio link 60 can be precisely calculated. The earth station controller 56 is already aware of the over all elapsed time for the propagation of the message along the radio paths 58, 60, 62, 64. By subtracting the calculated delay on the radio path 58 60 between the earth station 38 and the communications satellite 10 from the overall propagation delay, the propagation delay between the user terminal 44 and the communications satellite 10 may be precisely measured. This means that, since the propagation is entirely at the speed of light, the linear distance between the communications satellite 10 and the user terminal 44 is known. According to the propagation delay, the user terminal may exist on any point of a spherical surface centred on the communications satellite 10. Because the spherical surface intersects the surface of the earth 14, and the user terminal 44 is on the surface of the earth, the location of the user terminal 44 may be inferred as being on the line of intersection of the spherical surface of the earth 14 and the sphere of measured distance centred on the communications satellite 10.

Figure 7:
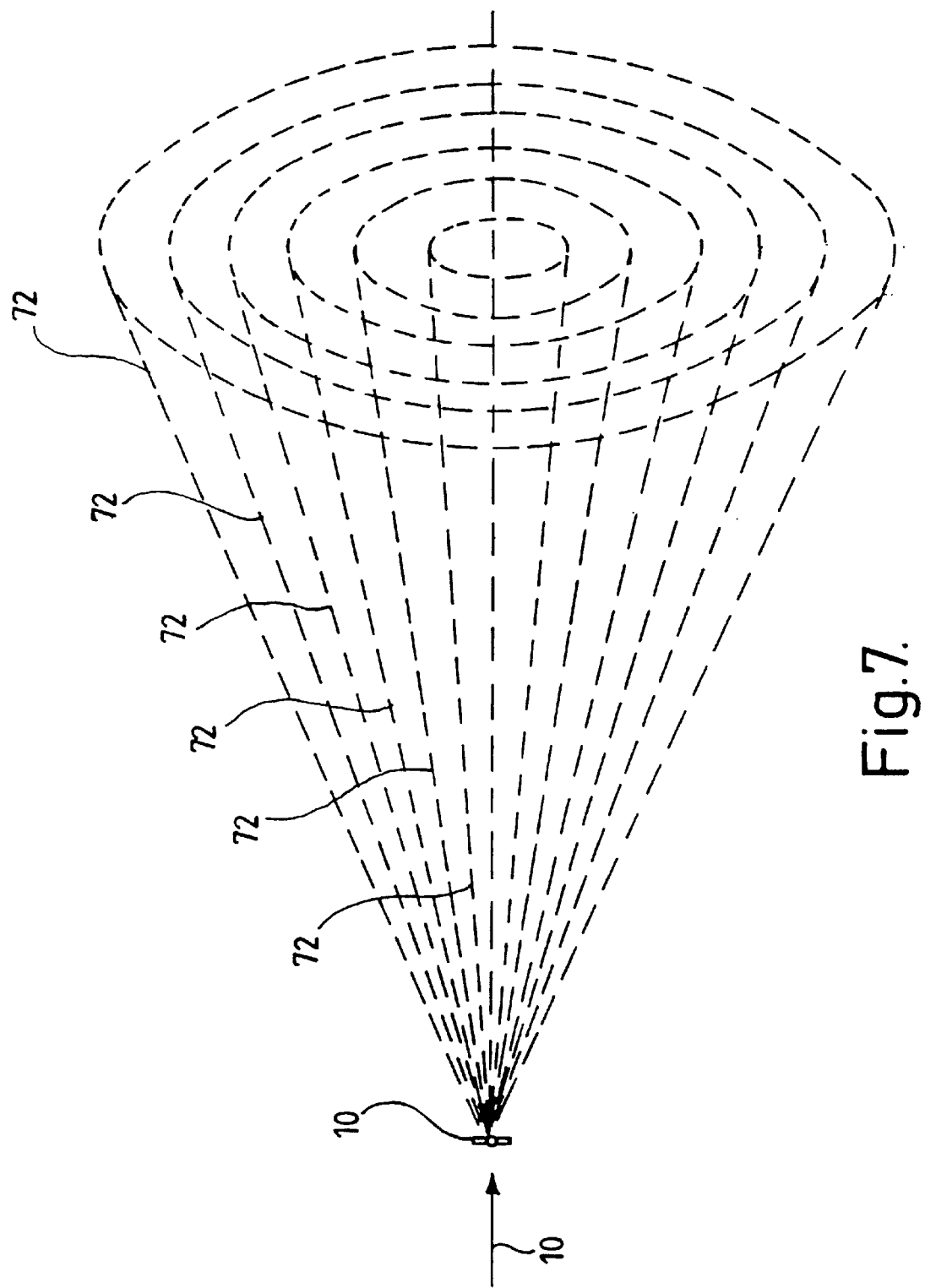
FIG. 7 shows the geometry of doppler frequency shift measurement for the communications satellite.

FIG. 7 shows the geometry of doppler frequency shift measurement for the communications satellite 10. As the communications satellite 10 moves as indicated by a 7th arrow 70, the change in frequency of a radio signal sent from the communications satellite 10 and the perceived frequency of a radio signal received by the communications satellite 10 from a fixed source such as the user terminal 44, depends upon the cosine of the angle between the communications satellite 10 and the recipient of a transmitted radio signal from the communications satellite or the source of a transmitted radio signal to the communications satellite 10. Accordingly, if we plot those regions in space for predetermined doppler frequency changes, there is obtained a series of coaxial cones 72 having the communications satellite 10 at their collective apex, extending towards infinity, and having, as their collected axis 74, the direction of the motion of the communications satellite 10 as indicated by the 7th arrow 70. FIG. 7 shows the cones 72 extending only for a finite distance. It is to be understood that the cones 72 are of infinite extension. Likewise, FIG. 7 has only shown the cones "in front" of the communications satellite for radio frequencies receivers or sources which the communications satellite 10 is approaching. It is to be understood that a corresponding set of coaxial cones 72 extend "behind" the communications satellite, having the same apex and axis. The doppler shift "in front" of the communications satellite 10 is shown by an increase in frequency. The doppler shift "behind" the communications satellite 10 is provided by a corresponding decrease in frequency.

Where the cones 72 cut the surface of the earth 14, for a particular doppler frequency shift, defines a further line along which the user terminal 44 may be located.

Referring again to FIG. 6, a doppler frequency shift measurement is executed by the earth station 38 providing a signal of known frequency on the uplink radio link 58. The communications satellite 10, using its own internal oscillator, translates the frequency of the signal and provides it on the user terminal downlink 62. The user terminal 44 then returns the signal via the user terminal uplink 64, once again to be converted in frequency by the internal oscillator of the communications satellite 10 and sent back to the earth station 38 via the downlink radio link 60. The earth station controller 56 measures the frequency of the downlink radio link 60 signal and deduces the doppler frequency shift, at the user terminal 44, resulting from the motion of the communications satellite 10 as indicated by the 5th arrow 66.

Figure 8:
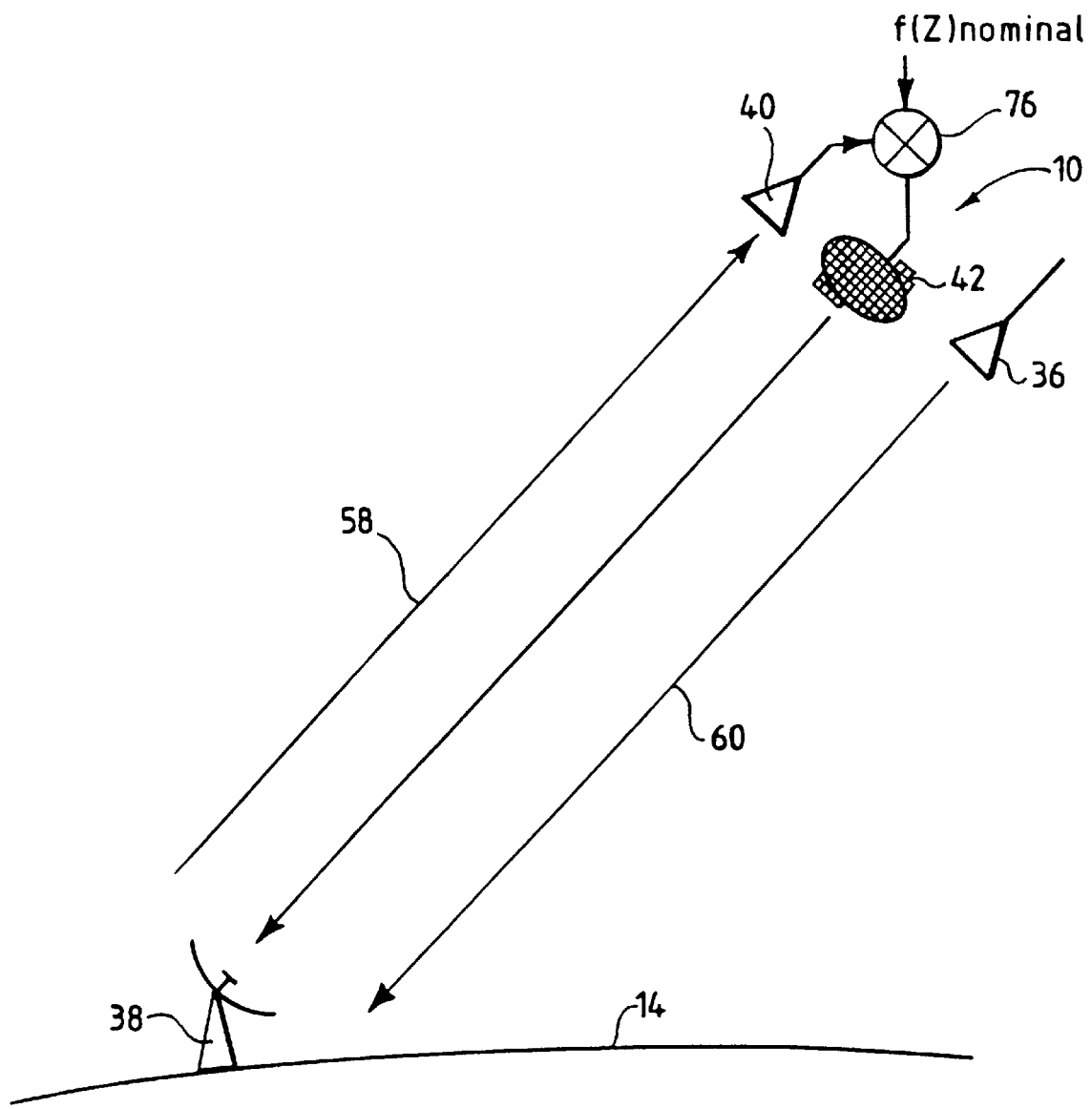
FIG. 8 is a schematic representation of the exchange of test signals between the earth station and the communications satellite to determine the relative doppler shift and internal oscillator error of the communications satellite.

FIG. 8 is a schematic diagram of the manner in which the earth station 38 and the earth station controller 56 interact with the communications satellite 10 to calibrate the errors and doppler shift experienced between the earth station 38 and the communications satellite 10.

The earth station 38 sends a signal of know frequency f(1) on the uplink radio link 58 to the communications satellite 10. The communications satellite 10 has an internal master oscillator which controls all of the synthesised frequencies used by communications satellite 10. If the master oscillator has a proportional error m, then any frequency, synthesised using the master oscillator, in the communications satellite, is proportionally in error, so that:

$$f(actual)=(1+m)f(intended)$$

Likewise, the communications satellite 10 is moving with respect to the earth station 38, thus introducing a proportional doppler shift, let us call it d, so that, no matter whether the signal goes from the earth station 38 to the communications satellite 10, or from the communications satellite 10 to the earth station 38:

$$f(received)=(1+d)f(sent)$$

Thus, if the earth station sends a frequency f(1) on the uplink radio link 58 to the communications satellite 10, because of doppler shift the communications satellite receives a frequency $$f(\text{received at communications satellite})=f(1)\ (1+d)$$

Now, the communications satellite employs a frequency changer 76 to convert the signal, received from the earth station 38, to a frequency suitable for use via the subscriber antenna 42. In order so to do, the communications satellite 10 synthesises an intended frequency f(2) to be subtracted from frequency of the signal received at the communications satellite 10 from the earth station 38. The intended frequency f(2) is subject to the proportional error in the master oscillator on the communications satellite 10, and so becomes f(2)(1+m).

The output of the frequency changer 76 is thus:

$$f(1)\ (1+d)-f(2)\ (1+m)$$

and this is sent, back to the earth station 10, via the subscriber antenna 44. But the communications satellite 10 is moving, and thus imparts a further doppler shift. Thus, the frequency, received by the earth station 38 from the subscriber antenna 42, let us call it f(R1), is given by $$f(R1)=(1+d)(f(1)(1+d)-f(2)(1+m))$$

The earth station controller 56 measures f(R1) with extreme precision. Thus, f(R1), f(1) and f(2) are all known numbers, but m and d are unknown. Expanding the expression for f(R1) we obtain $$f(R1)=(f(1)-f(2))+d(2f(1)+d^2f(1))-mdf(2)-f(2)m$$

The second order terms $d^2f(1)$ and mdf(2) are insignificant compared to the other terms, and can be ignored.

Thus $f(R1)=f(1)-f(2)+d(2f(1)+(2)-mf(2))$

The communications satellite 10 synthesises a third signal, with frequency f(3), which it sends via the downlink radio link 60 to the earth station 38. The third signal f(3) is subject to the proportional error of the master oscillator in the communications satellite 10. Thus, the actual frequency sent on the downlink radio link 60 becomes:

$$(1+m)f(3)$$

Since the communications satellite 10 is moving, the signal on the downlink radio link 60 is also subject to doppler shift. The frequency, f(R2), received at the earth station 38 on the downlink radio link 60 is thus given by:

$$f(R2)=(1+d)\ (1+m)f(3)$$

thus $f(R2)=f(3)+df(3)+mf(3)+mdf(3)$

The second order term mdf(3) is very small compared to the other terms and can be ignored. This leaves the following equations.

$$f(R1)=f(1)-f(2)+d(2f(1)-f(2))-mf(2)$$

and $f(R2)=f3(1+d+m)$

Now, f(1), f(2) and f(3) are precisely know numbers and f(R1) and f(R2) are accurately measured and thus known. This reduces the equations to being two simultaneous equations in two unknowns, namely m and d, which can thus be solved for the unknowns.

Figure 9:
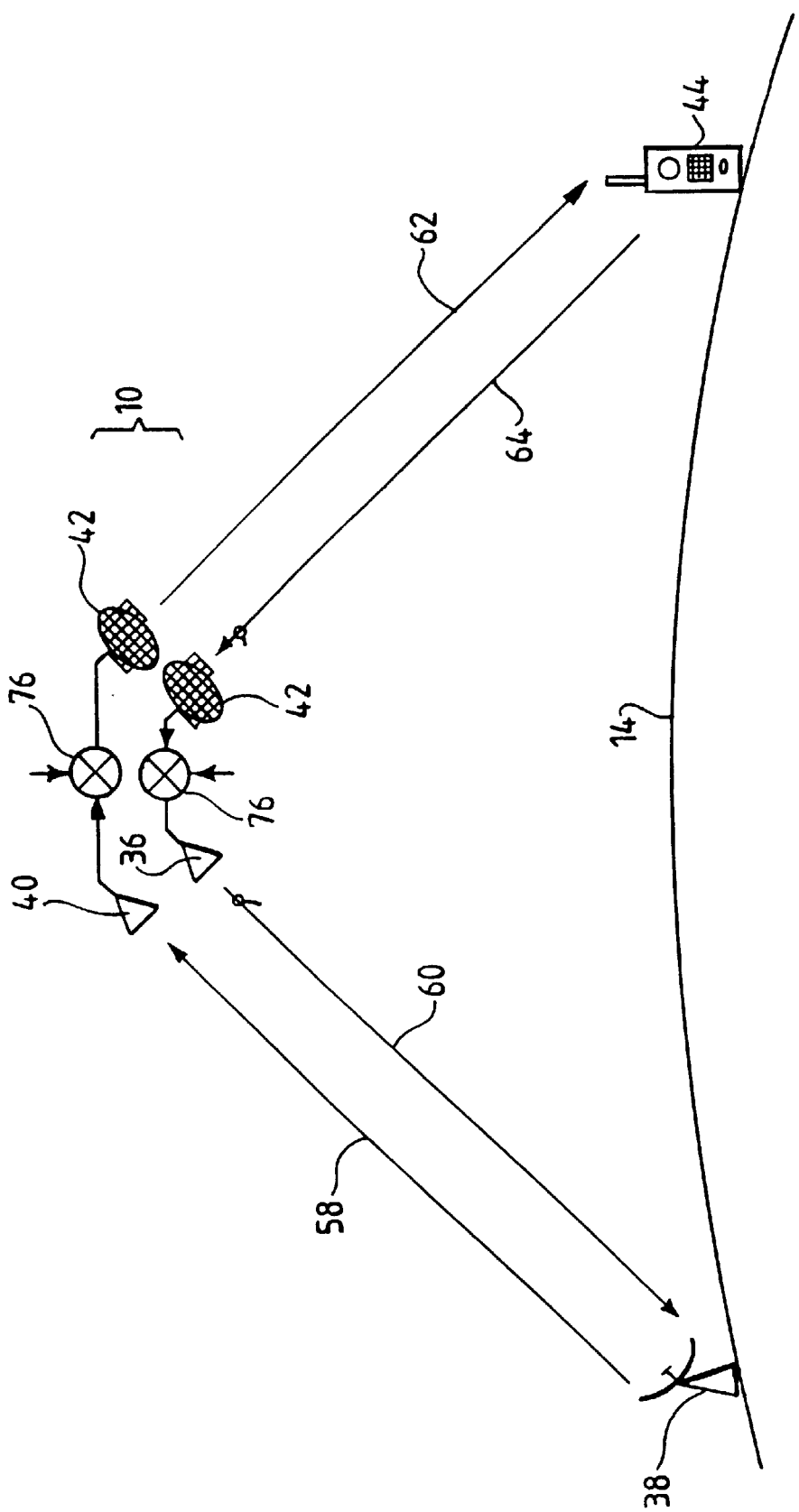
FIG. 9 is a schematic representation of how a calibrated communications satellite, according to FIG. 8, may, in turn, be used to determine the relative doppler shift between the communications satellite and user terminal and the internal oscillator error in the user terminal.

FIG. 9 is a schematic view of how the earth station 38 measures the proportional doppler shift error and master oscillator error on the user terminal 44.

The earth station 38 and the earth station controller 56 first 'calibrate' the communications satellite 10 as described with reference to FIG. 8. Being able to predict the behaviour of the communications satellite 10, the earth station 38 effectively moves its point of operation from the surface of the earth 14 and places it at the communications satellite 10. The communications satellite 10 will show a different doppler shift with respect to the earth station 38 than it displays with respect to the user terminal 38.

The subscriber antenna 42 and the frequency changer 76 are shown twice in the communications satellite 10 simply to indicate that two paths exist, where the earth station 38 receives signals from the user terminal 44 via the communications satellite 10 and the earth station 38 sends signals to the user terminal 44 via the communications satellite 10.

Firstly, the earth station 38 sends a signal on the uplink 58 which is transposed by the frequency changer 76 and sent down on the user terminal downlink 62 to the user terminal 44. The user terminal 44 makes a measurement of the signal on the user terminal downlink 62, transposes its frequency by a nominal fixed amount and resends the transposed signal on the user terminal uplink 64 to the communications satellite 10 via the subscriber antenna 42 to be transposed via the mixer 76 and sent, via the downlink radio link 60, to the earth station 38 where the earth station controller 56 makes an accurate frequency measurement. The user terminal 44 also makes an independent transmission, via the communications satellite, as described, at a nominal frequency, known to the earth station 38 and its controller 56.

A moment of reflection will show that precisely the same method has been used by the earth station 38, extended via the 'calibrated' communications satellite 10, to measure the errors of the user terminal 44, as the earth station 38 used to 'calibrate' the communications satellite. There has been one loop-back frequency measurement, and one independent signal at a nominal synthesised frequency. The earth station controller 56 corrects for the 'calibration' of the communications satellite, and once again works out the two equations in two unknowns to solve for the communications satellite 10 to user terminal 44 doppler shift and to solve for the proportional error in the master oscillator in the user terminal 44.

Figure 10:
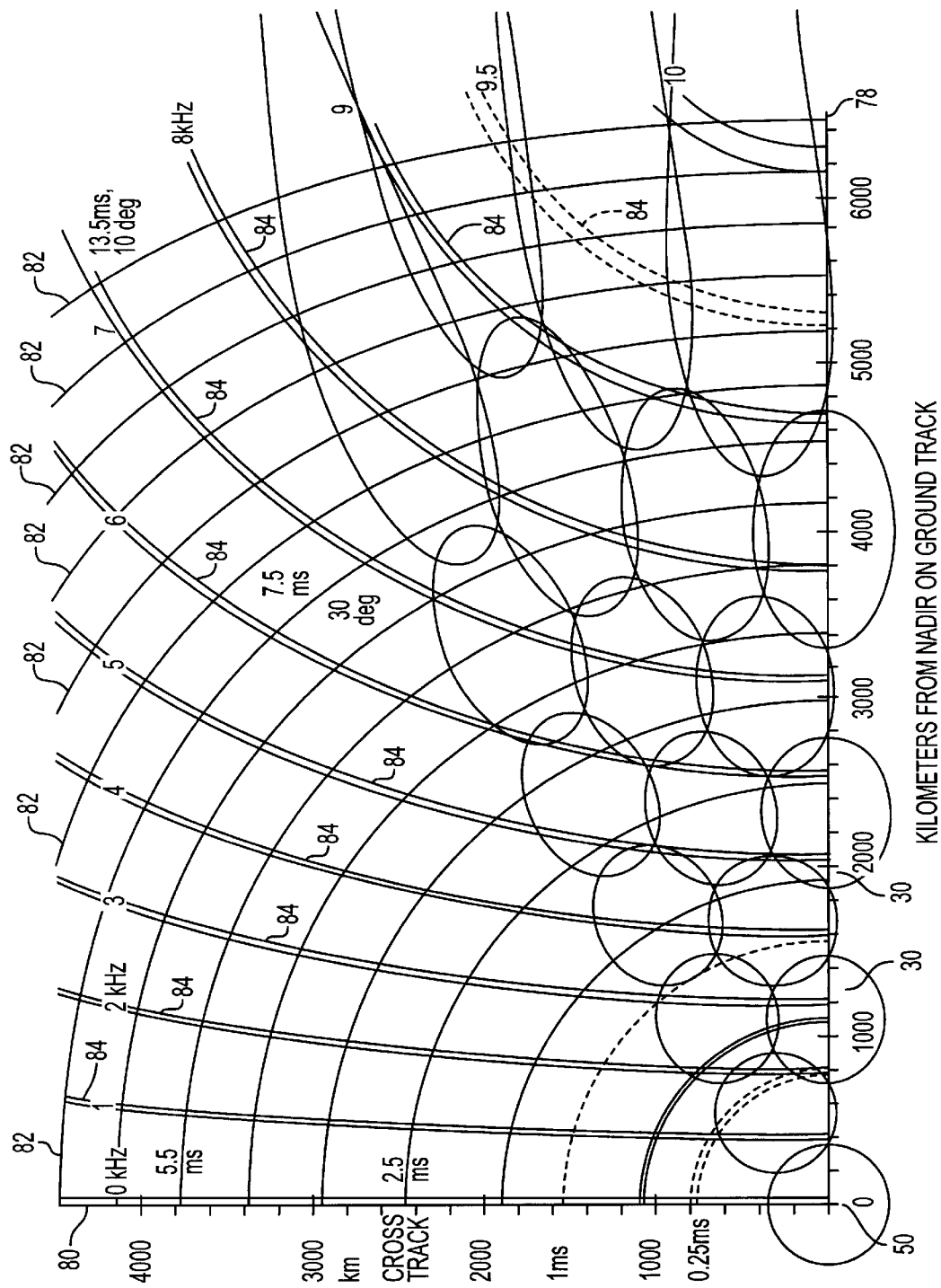
FIG. 10 shows how intersecting lines of measured doppler frequency shift and propagation delays may be used to measure the position of the user terminal on the surface of the earth.

FIG. 10 shows how measurement of Doppler frequency shift and delays can be used to locate a user terminal 44 on the surface of the earth 14.

In FIG. 10, the horizontal axis 78 corresponds to measurement in the direction of the second arrow 48 of FIG. 5 along the ground track. The vertical axis 80 corresponds to measurement along the cross track as indicated by the fourth arrow 54 in FIG. 6.

Only one quadrant is shown. It is to be understood that the pattern, as shown, is symmetrical about the axes in all four quadrants.

The delay measurements, described with reference to FIG. 6, create a series of delay contours 82, approximating to circles centred on the nadir 50 which corresponds to the point 00 in FIG. 10. Whereas the delay contours 82 represent the intersections of spheres of constant delay centred on the communications satellite, doppler contours 84 represent the lines of intersection of the plurality of coaxial cones 72 described in relation to FIG. 7. The figures given for the doppler contours relate to the doppler shift, in milliseconds, corresponding to the position, on the surface of the earth 14, where the user terminal 44 might be situated. Likewise, the figures adjacent to the delay contours 82 indicate the particular delay in milliseconds, for that particular delay contour 82 and that was the particular position on the surface of the earth 14. Various figures are shown in degrees, being the angle of elevation from the user terminal 44 to the communications satellite 10 if it were in that location. FIG. 10 extends out to a minimum elevation of 10 degrees, which, in this instance, is the operational minimal of the communications satellite communications system which holds the example given as the preferred embodiment of the present invention.

Also shown in FIG. 10, overlaid, are some of the spot beams 30 described with reference to FIG. 3 and 4.

It is to be understood that spot beams 30 fill the entirety of the four quadrants. Only a few spot beams 30 have here been shown to avoid undue cluttering and complication of FIG. 10.

Essentially, on the basis of a single delay measurement as described with reference to FIG. 6, and a single Doppler frequency shift measurement as described with reference to FIG. 8 and 9, it is possible to estimate the position of the user terminal 44 on the surface of the earth 14 at that point where its particular delay contour 82 and Doppler contour 84 cross.

Because there exist 4 quadrants, there is a degree of ambiguity in determining which of the four quadrants the user terminal 44 might be situated. Provided the ambiguity is large enough that the possible positions are all in separate spot beams 30, the uncertainty is resolved by noting which of the plurality of spot beams 30 received the signal from the user terminal 44. As will be seen from the second part of the description of the preferred embodiment of the invention, where the uncertainty is such that some possible points are contained within a single spot beam, other techniques must be applied.

It is to be observed, in FIG. 10, that the Doppler contours 84 are in fact drawn as a pair of lines rather than a single line. This is to represent the proportional error in the measurement. Close to the nadir 50, the lines in the doppler contour 84 are close together indicating a small positional error. By contrast, at large distances along the ground track shown by the horizontal axis 78, the pairs of lines in the doppler contours 84 become wider apart indicating a greater error. By contrast, although the delay contours 82 are also pairs of lines indicating an uncertainty, in the accuracy of the measurement, the pairs of lines in the delay contours are much closer together.

In order to overcome the rather large errors in the doppler contours 84 at great distances along the ground track as indicated by the horizontal likes of 78, an averaging process in undertaken.

Figure 11:
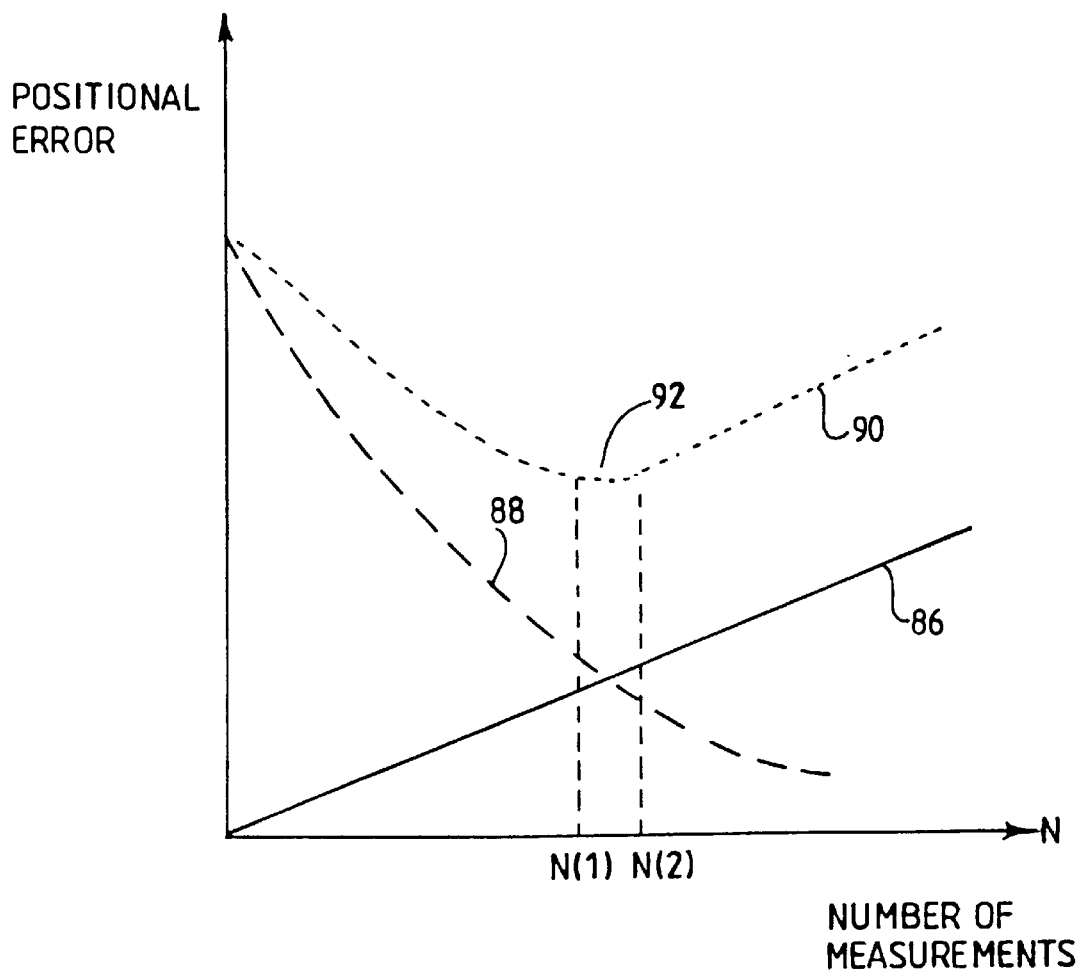
FIG. 11 is a graph showing the derivation of the optimal number of samples for best estimation of position.

FIG. 11 shows a surprising result. If no correction is made for the movement of the earth 14 relative to the nadir 50 of the communications satellite 10, or of the orbital velocity of the communications satellite 10 relative to the earth, the actual position of the user terminal 44, as shown in FIG. 11, relative to the communications satellite 10, steadily increases with time as shown by the solid line 86. Each measurement of the doppler shift and of the delay takes a predetermined period. Accordingly, the positional error as shown by the solid line 86 increases steadily with the number of measurements made.

The positional error, as measured, falls, by well known statistical principles, by the root of the sum of the squares. For example, if a hundred samples are taken, the average error falls to one tenth. If ten thousand samples are taken, the average error falls to one hundredth. If a million samples are taken, the average error falls to one thousandth, and so on. Broken line 88 indicates the falling rate of measured positional error against the number of samples.

The dotted line 90 represents the sum of the broken line 88 and the solid line 86 indicating the actual positional error against the number of samples. It is to be noted that there is a minimum region 92 where the measured positional error is at its least, fewer numbers of measurement producing a greater measured positional error, and greater numbers of measurements also producing a greater measured position error. It is to be observed that the minimum region 92 is quite flat and there are a range of values N(1) to N(2) between which the measured positional error is more or less at a minimum. An optimum number of numbers of measurements may thus be selected between the numbers N(1) and N(2) which will give the best positional estimation. The exact number of optimum measurements depends very much upon the initial measurement error. Returning, briefly, to FIG. 10, the slope of the broken line 88 representing the improvement of positional error in terms of the number of measurements taken, being a square root, it is to be observed that the delay contour lines 82 start off with a relatively small error so that, interpreting the graphs of FIG. 11, a relatively small number of measurements would be required to produce an optimum number of measurements. Conversely, the doppler contours 84, along the ground track is indicated by the horizontal axis 78 are relatively large so that the slope of the broken line 88 is relatively shallow, demanding a relatively large number of measurements to achieve a best estimation of positional error.

Figure 12:
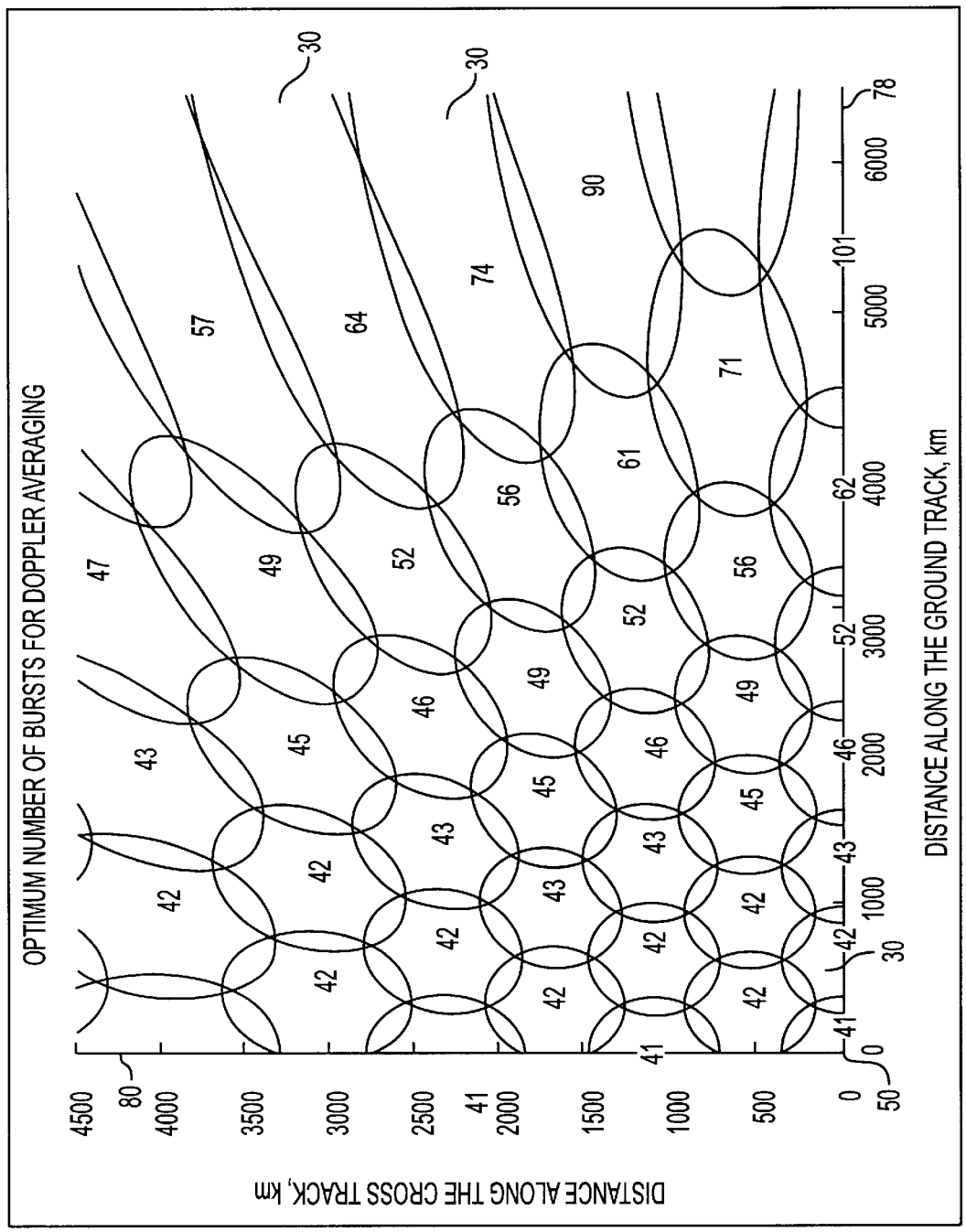
FIG. 12 is a chart showing, for the particular preferred embodiment, the derived optimal number of samples for doppler frequency shift averaging.

FIG. 12 is a first quadrant indication of the optimal number of measurements to be taken for each of the spot beam 30 depending upon the beam in which the user terminal 44 is found, for each of these spot beams 30, for doppler shift measurements, according to the preferred embodiment illustrating the present invention. It will be seen that numbers of optimum measurements range from 90 to 42. If other sampling rates and communications satellite orbital heights are chosen, other optimum numbers of measurement apply.

Figure 13:
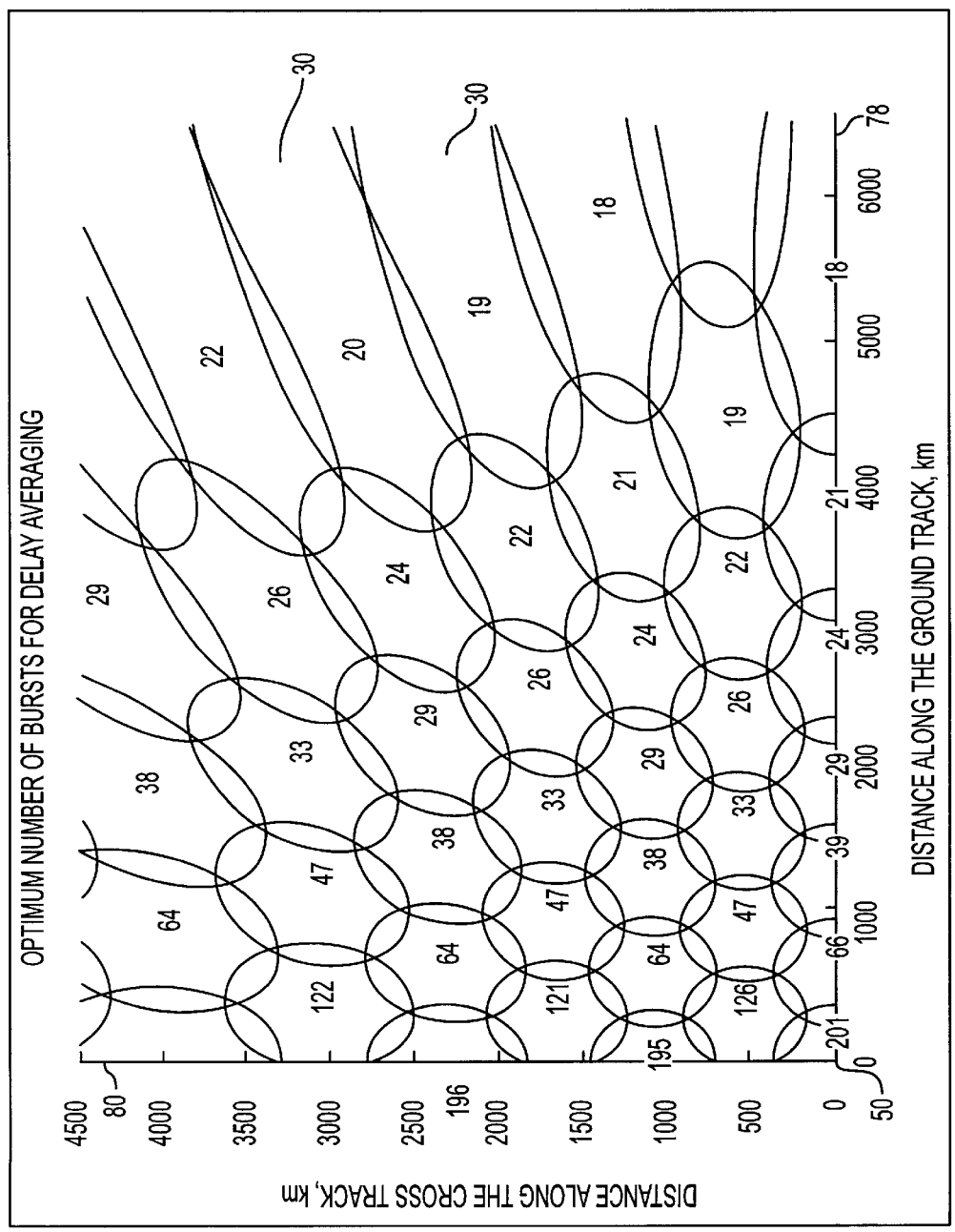
FIG. 13 is a chart showing, for the particular preferred embodiment, the derived optimal number of samples for propagation delay averaging.

Likewise, FIG. 13 shows the optimum number of bursts or samples for each of the spot beams 30 for delay measurements as described with reference to FIG. 6. Surprisingly, the optimum number of samples ranges from 201 near the nadir along the cross track as indicated by the vertical lines 80 and drops to surprising low values at the periphery of the spot beams 30.

The foregoing description applies to those areas 18, as shown in FIGS. 1 and 4, as having single radio coverage from a communications satellite 10. The following description applies to those areas 20, shown in FIGS. 1 and 4, where there is multiple radio coverage from the communications satellite 10.

Figure 14:
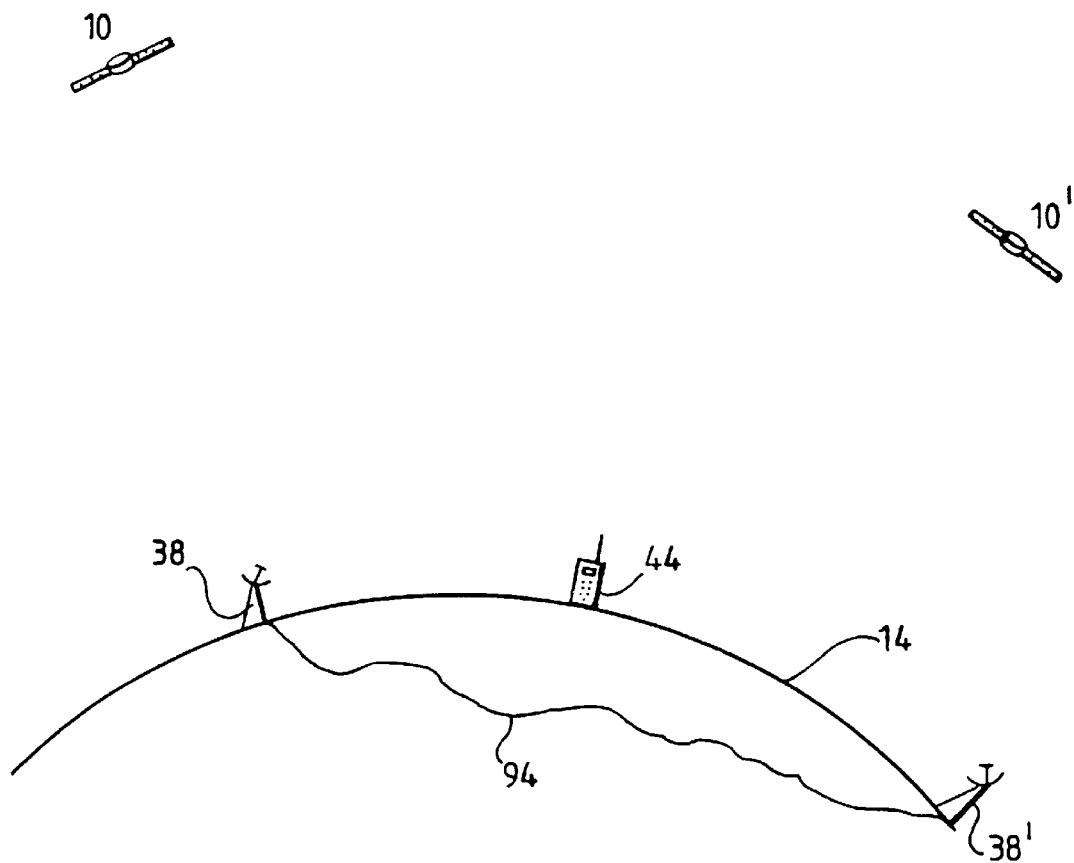
FIG. 14 shows the situation where the user terminal has direct access to more than one communications satellite.

FIG. 14 shows the situation where the user terminal 44 on the surface of the earth 14 has radio coverage from more than one communications satellite 10 10'. Ideally, the two communications satellites 10 10' should both be visible to the user terminal 44 and to a single earth station 38. However, it is possible that a communications satellite 10' may be visible of the user terminal 44 but not the single earth station 38. Alternatively, the other communications satellite 10' will be visible to another earth station 38'. This is not a problem since both earth stations 38 38' may be joined by a ground communication line 94 where data, derived from the communications satellite 10 10' and the user terminal may be exchanged for one of the earth stations 38 to act as a master in determining the position of the user terminal 44 on the surface of the earth 14.

If more than one communications satellite 10 10' is visible, or has been visible in the near past, instead of executing a doppler ranging operation as described with reference to FIGS. 7, 8, 9, 10, 11 and 12, a simple time delay measurement is executed as described with reference to FIGS. 6, 10, 11 and 13. An earth station 38 38' sends a signal to each of the communications satellites 10 10' and, as previously described, and measures the propagation delay between the communications satellite 10 10' and the user terminal 44.

As earlier described with reference to FIG. 6, the delay measurements generate, as the possible position of the user terminal 44 relative to the communications satellite 10, a spherical surface, centred on each of the communications satellites 10 10' which intersect with each other, and with the surface of the earth 14, to give a unique location for the user terminal 44 on the surface of the earth 14, subject to ambiguity resolution, hereinbefore described. If the user terminal is assumed to be on the surface of the earth, only two communications satellite propagation delays are necessary for absolute location of the user terminal. If more than 3 communications satellites 10 10' are so used, the user terminal 44 may be absolutely located in space, also allowing for altitude variations on the surface of the earth 14. It is to be noted, with reference to the description of FIG. 10, that the delay contours 82 are considerably more accurate, particularly at extreme range from the nadir 50 along the ground track as indicated by the horizontal likes of 78, than are the doppler contours 84. Accordingly, the method of measurement of the position of the user terminal 44 on the surface of the earth 14 describe with reference to FIG. 14 is more accurate.

Accordingly, the embodiment of the invention concerns itself with, in what manner, the position of the user terminal 44 is to be determined on the surface of the earth 14. Where only one communications satellite 10 is visible, the ranging method shown in FIG. 10 is employed. When more than one communications satellite is visible, the position determined method described in relation to FIG. 14 is employed.

Figure 15:
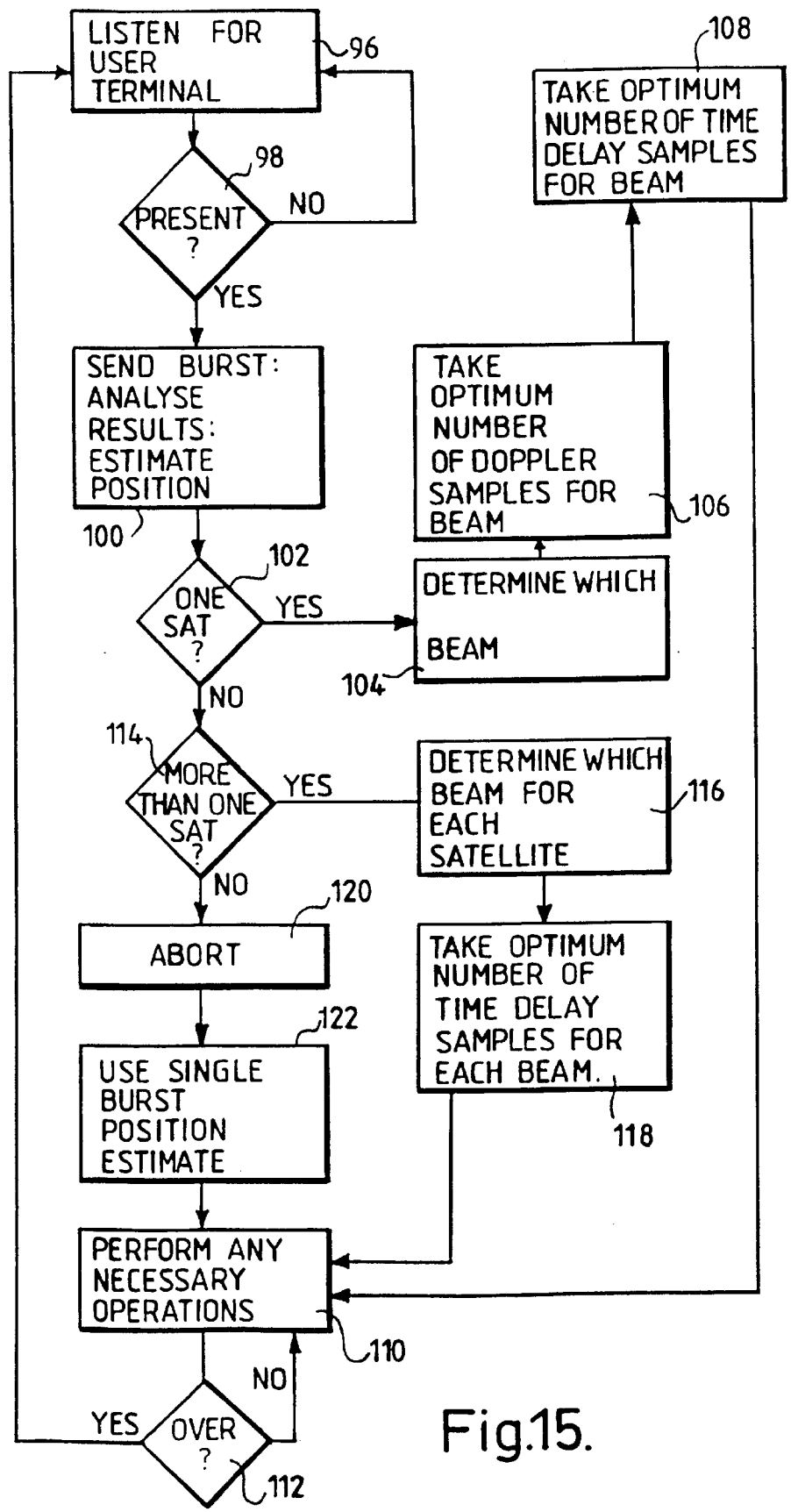
FIG. 15 is a flow chart of the activities of the earth station when determining the position of the user terminal on the surface of the earth employing one communications satellite, or more than one communications satellite, if available.

Attention is now drawn to FIG. 15 which shows the activity of the earth station controller 56 in that one of the earth stations 38 38' which executes the position determination for the user terminal 44.

In a first operation 96 the earth station 98 listens for a request of some kind of the user terminal 44. If a first test 98 fails to detect a call from the user terminal 44, control is passed back to the first operation 96. If the first test 98 determines that the earth station 38 has been polled by the user terminal 44, control is passed to a second operation 98. The second operation 98 sends a transmission, via the communications satellite 10, to the user terminal 44 as described with reference to FIG. 6, 9 and 10. It is to be presumed that the operation of FIG. 8, where the communications satellite is "calibrated", has already been executed. If the operation described with reference to FIG. 8 has not been executed, the second operation 100 executes the necessary calibration of the communications satellite 10.

The second operation 100 also analyses the results from the doppler frequency shift measurement and from the time delay measurement based on one mutual transmission between the earth station 38 and the user terminal 44 to give a guess as to the position of the user terminal 44 on the surface of the earth 44.

The earth station 38, having made an approximate estimate of the position of the user terminal 44, on the surface of the earth, is then in a position to determine whether or not the user terminal 44 will be visible to more than one communications satellite 10. If a second test 102 decides that only one communications satellite is visible, control passes to a third operation 104 which determines which one out of the plurality of spot beams 30 is occupied by the user terminal 44. This information may also be known by the earth station 38 based on which of the spot beams 30 the signal from the user terminal 44 was received.

Control passes from the third operation 104 to a fourth operation 106 where, with reference to FIG. 12 on its associated description, depending upon which spot beam 30 is occupied by the user terminal 44, the optimum number of samples by message exchange is executed. This gives the greatest provision in position determination as described with reference to FIG. 11.

When the fourth operation 106 has performed its necessary function, control passes to a fifth operation 108 where delay measurements are made, as described with reference to FIG. 6, for the optimum number of samples for delay measurement as described with reference to FIGS. 11 and 14.

The fourth 106 and fifth operations 108 may be conducted simultaneously, the number of sampling instance being the larger of which ever is greater for doppler shift or delay measurement as shown as reference to FIGS. 12 and 13 for a particular spot beam 30, and the result being analysed for the lesser number only up to the smaller number required, later results being discarded.

The sum of the function of the fourth operation 106 and the fifth operation 108 is to give the best estimate, based on the style of position analysis described with reference to FIG. 10 where spheres of constant time delay and cones of constant doppler shift intersect the surface of the earth 14.

At termination of the fifth operation 108, control is passed to a sixth operation 110 where any necessary communications operation is executed. This may comprise a telephone call, a request for updating of position and status, or whatever else may be required. If a third test 112 depicts that the necessary operation of the sixth operation 110 is terminated, control returns to the first operation 96 where the earth station 38 once again listens for the user terminal 44 through the communications satellite 10.

Returning to the second test 102, it has been detected that there is just not a single communications satellite, control is passed to a fourth test 114 which determines if there is more than one communications satellite present. If the fourth test 114 detects that there is a plurality of communications satellites 10 available, control passes to a seventh operation 116 where the earth station 38 via the earth station controller 56, determines for which of the plurality of spot beams 30 for each communications satellite the user terminal 44 is accessible. Thereafter, control passes to an eighth operation 118 where the earth station 38 exchanges the optimum number of radio bursts for each communications satellite 10 according to FIG. 6 and its associated description, and according to FIGS. 10 and 13 and their associated description. Once the position of the user terminal 44 has been determined by the eighth operation 118, control passes to the sixth operation 110 and thereafter as earlier described, back to the first operation 96.

If the fourth test 114 finds no communications satellites available, an unusual situation but none the less possible due to environmental blockage, control passes to a ninth operation 120 where the overall operation is aborted. Control then passes to a tenth operation where the earth station 38 assumes the rough position of the user terminal 44 based on the single burst doppler shift and delay measurements executed in the second operation 100.

After the tenth operation 122, control passes to the sixth operation 110 which performs any necessary operations, which, in this instance, might be for the earth station 38 to attempt to establish contact with the user terminal 44, or, perhaps, even to do nothing.

Control then passes back to the first operation 96.

Figure 16:
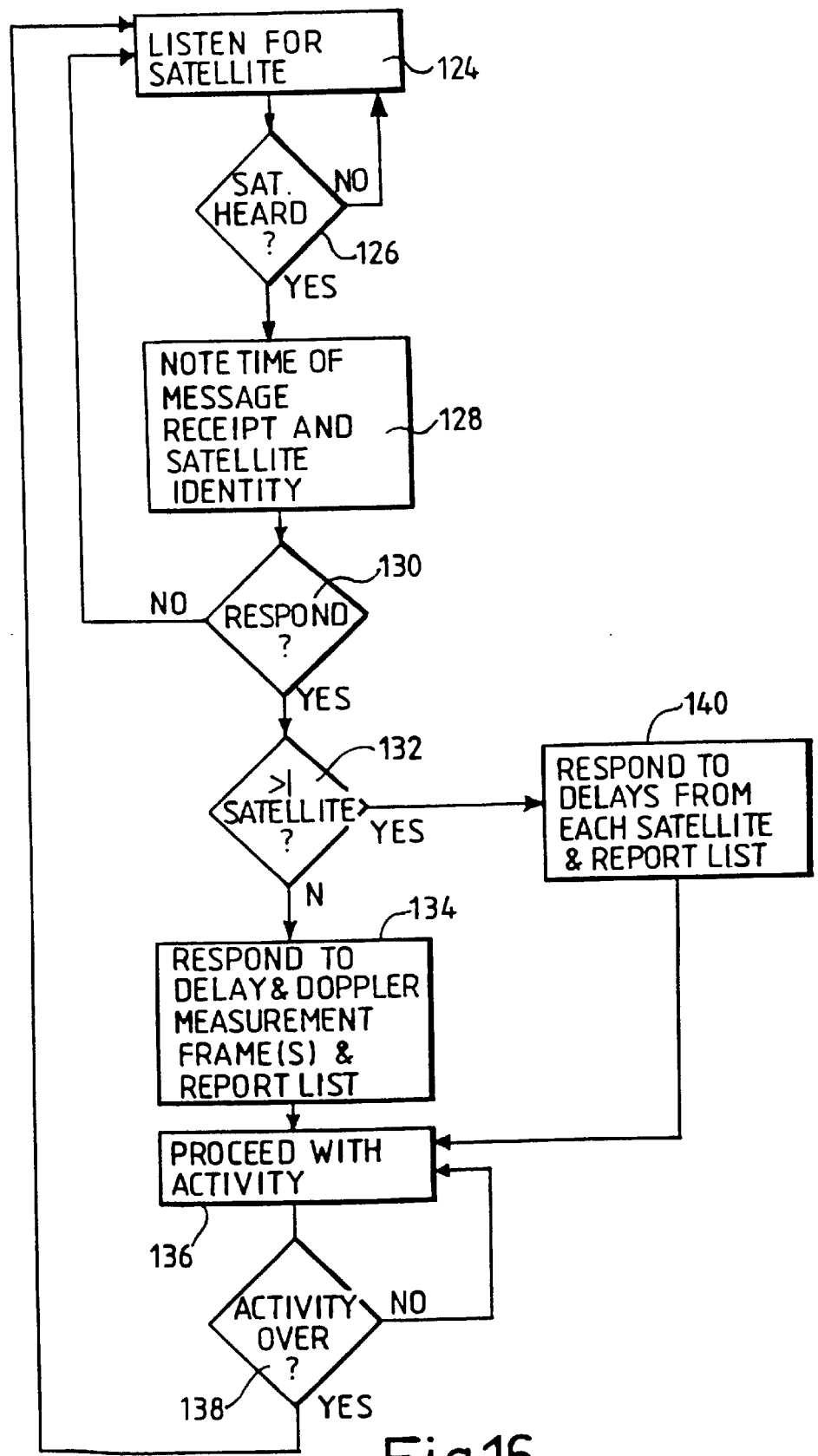
FIG. 16 is a flow chart showing how the earth station can incorporate timed broadcasts in determining the position of the user terminal on the surface of the earth.

FIG. 16 shows the activity of the user terminal 44 as it co-operates with the earth station 38 in yet a further alternative for locating the user terminal 44 in the surface of the earth 14.

The individual communications satellites 10, at periodical intervals, send out broadcast messages, on all of the spot beams 30, intended to be received by all user terminals 44. The broadcast message, from each communications satellite, originates originally, from an earth station 38 and contains information which identifies from which communications satellite the broadcast message is emanated. The time of transmission of the broadcast message is accurately known because, as described with reference to FIG. 6, the earth station is aware of the precise distance between itself and the communications satellite 10. Equally, as shown in FIG. 14, different earth stations 38' can instruct different communications satellites 10' to provide a broadcast message. Each earth station 38' is aware of the position of the communications satellite 10 at all times and will also be aware of the identity of the earth station 38 38' from which the broadcast message originated. As an alternative, the broadcast message can also include indication from which earth station it originated.

In any event, it is merely necessary to note the time of arrival of a broadcast message at a user terminal 44, and to know from which communications satellite 10 it originated, in order, effectively, to do a ranging "propagation delay" measurement on the user terminal 44 from the communications satellite 10. Once again, a sphere of fixed delay, in terms of distance, describes the potential locus of the user terminal 44 about the central communications satellite 10, and the user terminal 44 can lie on the line of intersection of the sphere centred on the communications satellite 10, with the surface of the earth 14.

Returning once again to FIG. 16, the user terminal, in an 11th operation 124, listens for the broadcast messages from the communications satellites 10 until a fifth test 126 detects that a communications satellite has been heard. Control then passes to a 12th operation 128 where the user terminal, using an internal clock, notes and stores the instant of receipt of the message from the communications satellite 10 together with the identity of the particular communications satellite 10 from which the message originated. The user terminal 44 keeps a record of the last several communications satellites 10 to be heard.

Control then passes to a sixth test 130 which checks to see if the user terminal 44 is required to respond to the communications satellite 10. If no response is required, control passes back to the 11th operation 124 where the user terminal once again listens for broadcast messages from the communications satellite 10.

If the sixth test 130 determines that the user terminal 44 is required to respond in some manner, perhaps for communications or registration purposes, control passes to a seventh test 132 which checks to see if only one communications satellite 10 is visible, or more than one communications satellite 10 is visible. This can be established from the list compiled in the 12th operation 128.

If the seventh test 132 detects that there is only one communications satellite visible, control passes to a thirteenth operation 134 where the user terminal 44 responds to delay and doppler measurements as indicated with reference to FIGS. 6 to 13. The user terminal 44 also sends, to the earth station 38 the list of times and identities of heard communications satellites 10 which was accumulated by the 12th operation 128.

The earth station controller 56 then combines all of these measurements and will know the position of the user terminal 44 on the surface of the earth 14. Control next passes to a fourteenth operation 136 where the user terminal 44 proceeds with whatever activity is required of it until an eighth test 138 detects that the activity is over and passes control back to the eleventh operation 124 where the user terminal 44 listens for messages from the communications satellites 10.

If the seventh test 132 detects that more than one communications satellite present, control passes to a fifteenth activity 140 where the user terminal 44 responds to a propagation delay measurement from each of the communications satellites 10 10' as described with reference to FIGS. 14 and 15. The user terminal 44 also reports, to the earth station 38, the contents of the list accumulated in the twelfth operation 128 during the time of receipt and identity of communications satellite broadcast messages.

At this point, the earth station 38 with which the user terminal 44 is interactive will have sufficient information to determine the position of the user terminal 44 along the surface of the earth 14.

The fifteenth activity 140 having being completed, control passes to the fourteenth activity 136 which proceeds with whatever activity the user terminal is required to perform and then, via the eighth test 138, returns control to the eleventh operation 124 where the user terminal 44 continues to listen to broadcast messages from communications satellites 10.

It is to be noted that, if there are sufficient readings listed by the twelfth operation 128 and the user terminal 44 has not been moving any significant distance over time, then the position of the user terminal 44 on the surface of the earth 14, may adequately and accurately be measured simply on the basis of the record accumulated by the twelfth operation 128 thus dispensing with the necessity in the fifteenth activity 140 to measure delays from each visible communications satellite or, in the thirteenth activity 134 to perform a doppler measurement together with a delay measurement.

Equally, in the thirteenth activity 134, if the combined propagation delay and Doppler frequency shift measurement produces a location which roughly corresponds to the location resulting from intersection of the spheres of constant delay as determined from the list of broadcast receipt times and communications satellite identities as collected by the twelfth operation 128, and this latter determination is more accurate, then the earth station 38, through its earth station controller 56, can opt to use the latter determination.

Another extremely significant element of the compilation of the list by the twelfth operation 128 and its being reported by the thirteenth operation 134 and the fifteenth activity 140 is very simply that the position of the user terminal 44 on the surface of the earth, can be measured using communications satellites 10 which are no longer visible to the user terminal 44. This is in contrast to all other methods which require that a communications satellite 10, used for a position determination, should be visible to the user terminal 44.

The user terminal 44 comprises an internal clock. This clock, of course, has relative inaccuracies. The earth station 38, in combination with the earth station controller 56, possess a very accurate clock. In order for the earth station 38 properly to use the list gathered by the 12th operation 128, it is necessary to correct the errors in the clock on the user terminal. This is very simply done. The earth station 38, at a first known instant, requests the user terminal 44 to indicate the time, on its clock to the earth station 38. The earth station 38 knows the propagation delay between itself and the user terminal 44. The time of response, by the user terminal 44, is thus very accurately known. Having noted what time the user terminal clock believes it to be, the earth station 38 and the earth station controller 56 wait for a predetermined period, perhaps one second, and request that the user terminal 44 once again tells the earth station 38 what time the user terminal thinks it is. The earth station 38 thus has two readings from which the rate of drift of the clock on the user terminal 44 and the accumulated timing error can be determined. The earth station 38, with the earth station controller 56, can thus extrapolate using the known drifts and errors, the times recorded in the list generated by the twelfth operation 128. The corrected times are then compared with the known times of transmission from each communications satellite 10 of the particular broadcast messages. The earth station controller 56 can then calculate the propagation delay between each communications satellite and the user terminal. Since the position of each communications satellite is accurately known, it is possible to determine the range of the user terminal 44 from the particular communications satellite which did the broadcasting.

The previously described measures can be used singly, multiply or in any combination to determine the location of the user terminal 44 on the surface of the earth 14. If two communications satellites are visible, the present invention also includes the possibility of using a doppler frequency shift measurement from each of the communications satellites to determine the position of the user terminal 44.

These techniques need not be restricted to items on the surface of the earth 14. Using satellite ranging techniques, it is possible to measure the position of an item, such as a terminal, in free space. While the embodiment of the invention hereinbefore and hereinafter described relates to location of items on the earth's surface, it is to be understood that measurements can be made to terminals 44 on aircraft, spacecraft and atop high mountain peaks.

The description, thus far, of the preferred embodiment, has illustrated just one set of ways in which the position of a user terminal 44 can be measured. Those, skilled in the art, will be aware of other methods and systems for finding the position of a user terminal. While the present invention is particularly suited to satellite communication systems, such as that hereinbefore described, it is not restricted thereto and can be applied to any system where the position of a terminal can be measured, but with an uncertainty as to which out of a plurality of possible positions the user terminal occupies.

Figure 17:
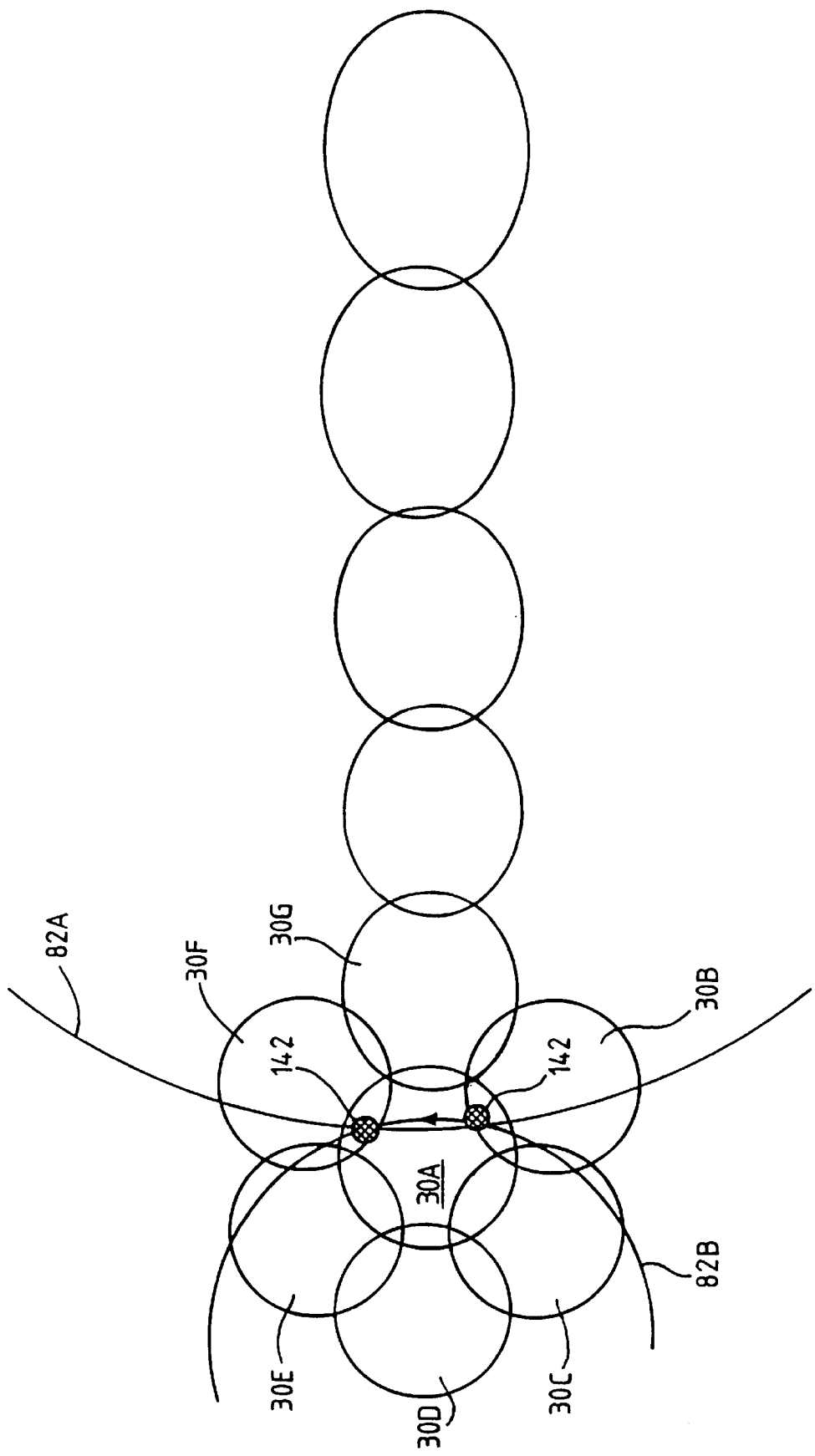
FIG. 17 is a diagram showing how possible positions of the user terminal may be difficult to resolve as a result of being in a single beam.

Attention is drawn to FIG. 17, which shows the situation the present invention seeks to resolve.

Figure 18:
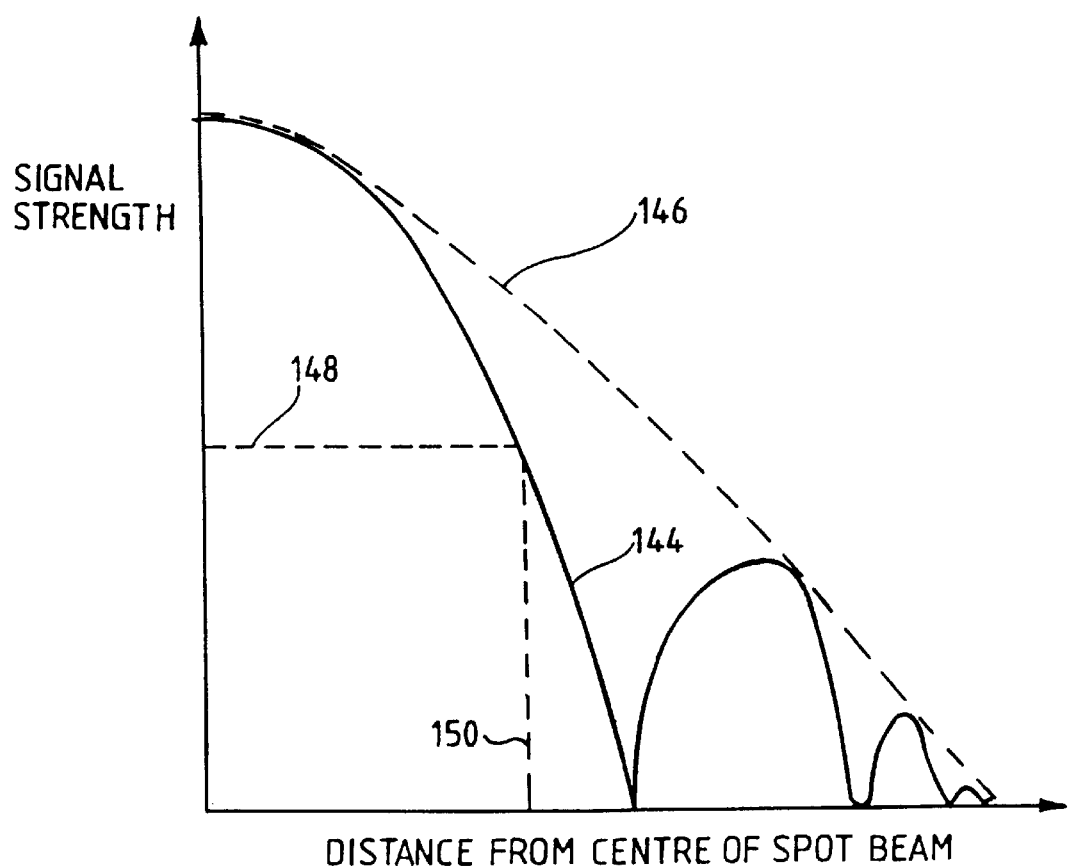
FIG. 18 is a graph of an exemplary field strength for signals from a beam.

Two satellites 10 provide a first delay contour 82A and a second delay contour 82B which have two points of intersection 142 in a single spot beam 30A. The single spot beam 30A abuts and overlaps adjacent other spot beams 30B 30C 30D 30E 30F 30G. The user terminal 44 can lie on either of points of intersection 142, There is an ambiguity which, in this instance, cannot be resolved by determining in which beam 30 the user terminal 44 lies, since both possible locations are in the same spot beam 30. Although the spot beams 30 are depicted as having firm edges, it is to be understood that, in fact, the spot beams 30 do not cease abruptly. FIG. 18 shows an example of a spot beam response. The signal strength is plotted against distance from the centre of the spot beam 30. The signal strength curve 144 is a rapidly fluctuating function of distance, having many peaks and nulls, but generally conforming to an envelope 146. At a predetermined signal strength 148, selected to be the least acceptable for service, the perimeter distance 150 for the spot beams 30 is determined, and this corresponds to the firm boundaries shown in other Figures. FIG. 18 makes it clear, however, that the spot beams 30 in fact provide radio signals well into each others perimeters 150, even although the signal strength is below service quality.

The satellite 10 puts out regular broadcasts on each of the spot beams 30, each broadcast providing identification of from which spot beam 30 the broadcast originates. The user terminal 44 listens to the broadcasts from the adjacent other spot beams 30B–30G to determine which of the points of intersection 142 the user terminal 44 occupies.

Figure 19:
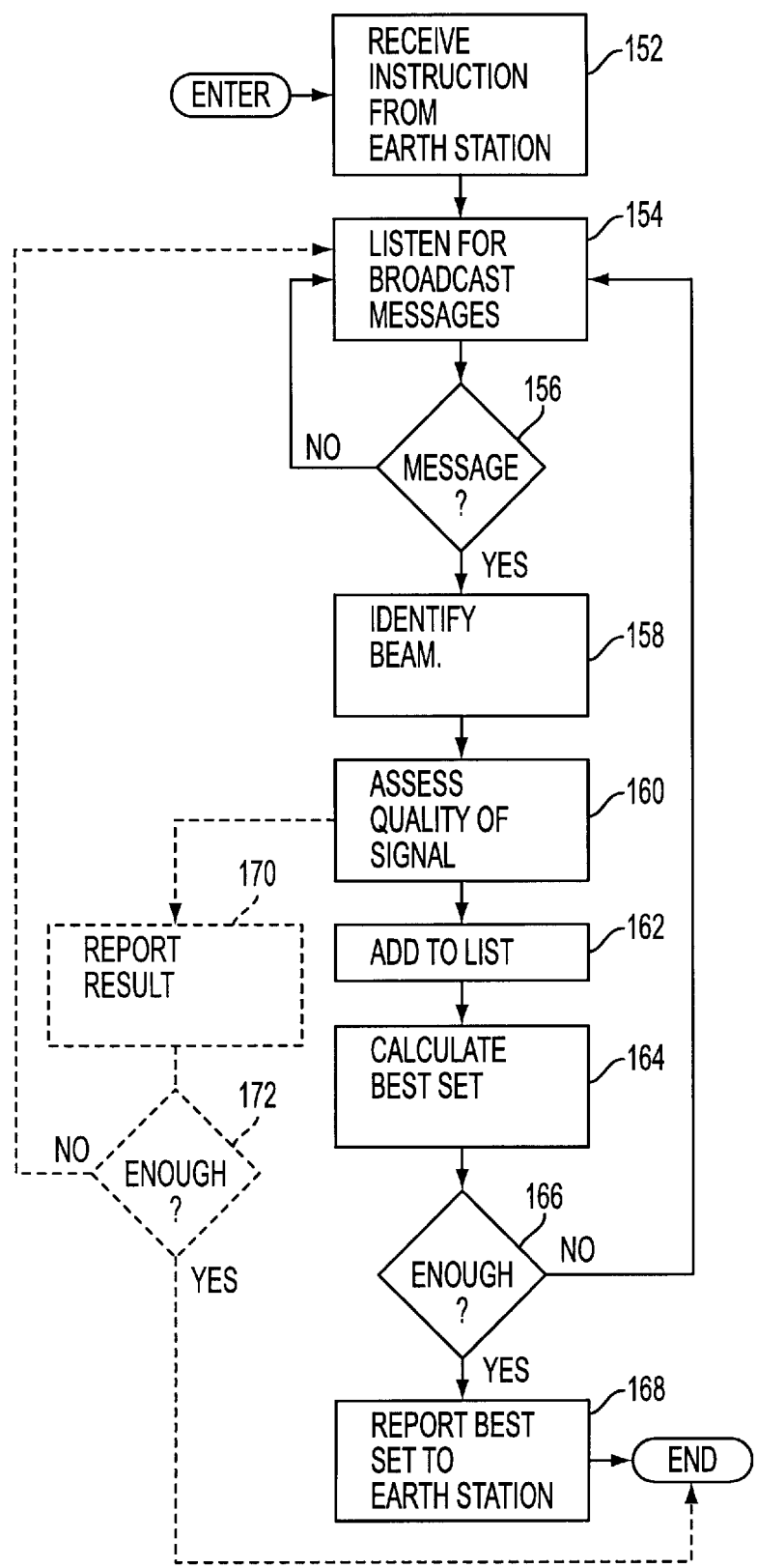
FIG. 19 is a flow chart of the activity of the user terminal in resolving the uncertainty of position of the user terminal.

FIG. 19 is a flow chart showing the activities of the user terminal 44 when listening to broadcast messages from the adjacent, abutting and overlapping spot beams 30B–30G.

Entry is to a sixteenth activity where the user terminal 44 receives an instruction, from the earth station 38, to determine where, in a particular spot beam 30, the user terminal 44 may be located. The earth station 38 will issue the command to the user terminal 44 in the event that it finds two or more points of intersection 142 in the same spot beam. The example here given, relating to FIG. 17, shows only two points of intersection 142. It is to be understood that three or more points of intersection can arise, where three or more satellite 10 distance estimations have been made to the user terminal 44. It is also to be understood that the points of intersection 142 can lie not all in the same spot beam 30. No matter what the particular result, the earth station 38 issues the command, to the user terminal 44, whenever two or more points of intersection 142 fall within the same spot beam 30.

Control then passes to a seventeenth activity 154 where the user terminal 44 listens for any broadcast messages, which it can hear, from the earth station 38. Each spot beam has its own identity message, so that the beam of origin of a broadcast can be identified.

When a ninth test 156 detects that a broadcast message can be heard, control passes to an eighteenth activity 158 where the user terminal 44 extracts the beam identity from the broadcast signal and passes control to a nineteenth activity 160 where the user terminal assesses the signal quality.

Signal quality assessment can take many forms. A first preferred method is simply to measure the amplitude of the received broadcast message. A second preferred method is to measure the "bit error rate" (BER) of a digital message received in the broadcast signal, where an estimation of the proportion of all of the binary digits which were erroneously received as against the total number of binary digits in the message gives a measure of signal quality.

Control then passes to a twentieth activity 162 where the identity of the beam 30 wherefore the broadcast signal was received and the corresponding assessment of the signal quality are stored in a list. When enough results have been received, a twenty-first activity 164 calculates to which of the adjacent overlapping beams 30B–30G the user terminal 44 most closely lies so that the point of intersection 142 most appropriately placed can be selected as the actual position of the user terminal 44.

While it is possible to make a calculation of the best set of adjacent, overlapping spot beams 30B–30G based on just one measurement (if available) per spot beam 30B–30G, it is preferred that plural measurements per spot beam 30B–30G are made. Returning briefly to FIG. 18, it is to be observed that, despite a potentially high amplitude, the user terminal 44 may, for the moment, be in a deep null where a false impression of the signal strength is given. However, it is to be recalled that the array of spot beams 30 is sweeping across the surface of the earth 14 in excess of 4 Km per second, so that a user terminal 44, momentarily in a null, is soon removed from the null and receives a signal of more appropriately representative strength.

Likewise, for geographical reasons, such as hills or buildings or other obstructions, a particular adjacent spot beam 30B–30G may not be audible to the user terminal 44 or may have a severely attenuated signal. Once again, although there is no guarantee, the movement of the array of spot beams 30 across the surface of the earth 14 should assist in gaining a more accurate representation of the signal through time.

It therefore is preferred that a plurality of samples of signal quality are made for signals from all audible adjacent spot beams 30B–30G. When a tenth test 166 determines that a sufficient number of samples have been taken, control passes to twenty second activity 168 where the user terminal 44 determines which, as a result of the plurality of samples, is the best set of signals from the adjacent spot beams 30B–30G, and reports the result back to the earth station 38. If the tenth test 166 determines that not enough samples have been collected, control passes back to the seventeenth activity 154 where more signals are sought.

Re-examination of FIG. 18 will show how the signal strength of an adjacent spot beam 30B–30G falls off within the target spot beam 30A. While signals are available all across the target spot beam 30A, high amplitude signals with a good bit error rate are receivable only when the user terminal 44 is proximate to that part of the perimeter 150 adjacent to the particular adjacent spot beam 30B–30G wherefrom the signal is received.

Thus, even if obstruction blocks signals from some adjacent spot beams 30B–30G, the fact that a single high amplitude signal is received indicates a close proximity of the user terminal 44 to the perimeter 150 of the originating adjacent spot beam 30B–30G. If several high amplitude signals are received from several adjacent spot beams 30B–30G, even more confirmation is given of the position of the user terminal 44.

The twenty-second activity 168 exits to allow the user terminal 44 to continue with whatever activities it is thereafter required to do.

As a variant of the flow chart of FIG. 19, it is not absolutely necessary to incorporate the sixteenth activity 152. Instead, the user terminal 44 can continuously keep a running log of a set of the most recently received messages from spot beams 30 to be stored in the twentieth activity 162 and reported to the earth station 38 in the twenty-second activity 168 only when the earth station makes a request for the information, either directly or implicitly. This has the advantage that results are instantly available to the earth station 38 without having to wait for the user terminal 44 to gather samples.

It is not imperative that the user terminal 44 itself be used for making the assessment of the best set of signals from the adjacent overlapping spot beams 30B–30G. As an alternative, in FIG. 19, shown in broken line, the nineteenth activity 160 can, alternatively, pass control to a twenty-third activity 170 where the user terminal 44 passes each signal quality assessment to the earth station 38 as it is received for the earth station 38 to make its own estimation of which of the points of intersection is actually occupied by the user terminal 44. When the user terminal 44 determines it has taken enough samples, or when the earth station 38 informs the user terminal 38 that enough samples have been taken, the user terminal 44 ends this routine, other wise control passes back to the seventeenth activity 154 where further samples are sought.

As before, while the twenty-third activity 170 is shown as reporting each sample as it appears, eaqually the twenty-third 170 activity can send a plurality of previous assessments so that the earth station 38 can have instant availability thereof.

What is claimed is:

1. A satellite telecommunications system comprising:
   a ground station to transmit signals to and receive signals from a least one earth orbiting satellite,
   a user terminal to transmit signals to and receive signals from the satellite, whereby to provide communication between the ground station and the user terminal via the satellite, the satellite providing user terminal transmissions in a plurality of radio beams which define adjacent cellular areas of coverage on the earth,
   a processor to process signals received by the user terminal according to at least one predetermined characteristic to determine data corresponding to first and second positional loci for the user terminal which intersect twice in a particular one of the cellular areas to define first and second possible positions for the user terminal both of said possible positions being within said particular one of the cellular areas, and a monitoring system to monitor the quality of signals received by the user terminal from the radio beams corresponding to the cellular areas of coverage adjacent to said particular one thereof and to determine from the measured qualities of the monitored signals, which of said possible positions for the user terminal corresponds to its actual position in said particular cellular area.

2. A system according to claim 1 wherein the predetermined characteristic with respect to which said signals received by the user terminal are processed by the processor, includes Doppler shift, such as to define a first Doppler shift experienced for the received signals at the user terminal and thereby to provide data corresponding to the first of the positional loci in terms of said Doppler shift within the particular cellular area of coverage.

3. A system according to claim 2 wherein the predetermined characteristic with respect to which said signals received by the user terminal are processed by the processor, includes Doppler shift, such as to define a second Doppler shift experienced for the received signals at the user terminal and thereby to provide data corresponding to the second of the positional loci in terms of said Doppler shift within the particular cellular area of coverage.

4. A system according to claim 3 wherein processor is configured to process signals received from a second satellite to derive the second Doppler shift.

5. A system according to claim 2 wherein the predetermined characteristic with respect to which said signals received by the user terminal are processed by the processor, includes a time delay such as to define the time delay experienced for the received signals at the user terminal and thereby to provide data corresponding to the second of the positional loci in terms of said time delay within the particular cellular area of coverage.

6. A system according to claim 1 wherein the predetermined characteristic with respect to which said signals received by the user terminal are processed by the processor, includes time delay, such as to define first and second time delays experienced for signals from first and second satellites received at the user terminal and thereby to provide data corresponding to the first and second positional loci in terms of said time delays within the particular cellular area of coverage.

7. A system according to claim 1 wherein the predetermined characteristic with respect to which said signals received by the user terminal are processed by the processor, includes time delay for a cell broadcast signal.

8. A system according to claim 1 wherein the monitoring system is configured to monitor received signal quality in terms of bit error rate.

9. A system according to claim 8 including processing said signals received by the user terminal in relation to Doppler shift, such as to define a first Doppler shift experienced for the received signals at the user terminal and thereby to provide data corresponding to the first of the positional loci in terms of said Doppler shift within the particular cellular area of coverage.

10. A system according to claim 9 including processing said signals received by the user terminal in relation to Doppler shift, such as to define a second Doppler shift experienced for the received signals at the user terminal and thereby to provide data corresponding to the second of the positional loci in terms of said Doppler shift within the particular cellular area of coverage.

11. A system according to claim 10 wherein processor is configured to process signals received from a second satellite to derive the second Doppler shift.

12. A system according to claim 11 including processing said signals received by the user terminal in relation to time delay such as to define the time delay experienced for the received signals at the user terminal and thereby to provide data corresponding to the second of the positional loci in terms of said time delay within the particular cellular area of coverage.

13. A system according to claim 8 including processing said signals received by the user terminal in relation to time delay, such as to define first and second time delays experienced for signals from first and second satellites received at the user terminal and thereby to provide data corresponding to the first and second positional loci in terms of said time delays within the particular cellular area of coverage.

14. A system according to claim 8 wherein the predetermined characteristic with respect to which said signals received by the user terminal are processed by the processor, includes time delay for a cell broadcast signal.

15. A system according to claim 8 including monitoring the received signal quality in terms of bit error rate.

16. A method of resolving positional ambiguities in a satellite telecommunications system wherein a ground station and a user terminal transmit signals to one another via a least one earth orbiting satellite, the satellite providing user terminal transmissions in a plurality of radio beams which define adjacent cellular areas of coverage on the earth, the method comprising processing signals received by the user terminal according to at least one predetermined characteristic to determine data corresponding to first and second positional loci for the user terminal which intersect twice in a particular one of the cellular areas to define first and second possible positions for the user terminal in said cellular area, and monitoring the quality of signals received by the user terminal from the radio beams corresponding to the cellular areas of coverage adjacent to said particular one thereof and to determine from the measured qualities of the monitored signals, which of said possible positions for the user terminal corresponds to its actual position in said particular cellular area.

17. A user terminal for a satellite telecommunications system wherein a ground station transmits signals to and receives signals from a least one earth orbiting satellite, and the satellite provides user terminal transmissions in a plurality of radio beams which define adjacent cellular areas of coverage on the earth, the user terminal comprising:

a transmitter-receiver unit to transmit signals to and receive signals from the satellite, whereby to provide communication between the ground station and the user terminal via the satellite, a processor to process signals received by the user terminal according to at least one predetermined characteristic to determine data corresponding to first and second positional loci for the user terminal which intersect twice in a particular one of the cellular areas to define first and second possible positions for the user terminal both of said possible positions being within said particular one of the cellular areas, and a monitoring system to monitor the quality of signals received by the user terminal from the radio beams corresponding to the cellular areas of coverage adjacent to said particular one thereof whereby to permit a determination to be made from the measured qualities of the monitored signals, which of said possible positions for the user terminal corresponds to its actual position in said particular cellular area.

* * * * *